United States Patent
Yamashita et al.

(10) Patent No.: US 8,767,036 B2
(45) Date of Patent: Jul. 1, 2014

(54) PANORAMIC IMAGING APPARATUS, IMAGING METHOD, AND PROGRAM WITH WARNING DETECTION

(75) Inventors: Noriyuki Yamashita, Tokyo (JP); Toshifumi Fujita, Kanagawa (JP)

(73) Assignee: Sony Corporation, Tokyo (JP)

( * ) Notice: Subject to any disclaimer, the term of this patent is extended or adjusted under 35 U.S.C. 154(b) by 296 days.

(21) Appl. No.: 12/570,771

(22) Filed: Sep. 30, 2009

(65) Prior Publication Data

US 2010/0085442 A1  Apr. 8, 2010

(30) Foreign Application Priority Data

Oct. 3, 2008  (JP) ................................ 2008-258114

(51) Int. Cl.
*H04N 7/00* (2011.01)
*H04N 5/228* (2006.01)

(52) U.S. Cl.
USPC ............... 348/36; 348/37; 348/38; 348/39; 348/222.1

(58) Field of Classification Search
None
See application file for complete search history.

(56) References Cited

U.S. PATENT DOCUMENTS

| | | | | |
|---|---|---|---|---|
| 5,608,543 A * | 3/1997 | Tamagaki et al. | ............. | 358/450 |
| 5,937,212 A * | 8/1999 | Kurahashi et al. | ............. | 396/20 |
| 6,411,326 B1 * | 6/2002 | Tabata | ............. | 348/47 |
| 6,476,861 B1 | 11/2002 | Min | | |
| 7,221,401 B2 | 5/2007 | Hama | | |
| 2005/0280733 A1 | 12/2005 | Imaizumi | | |
| 2006/0125921 A1 * | 6/2006 | Foote | ............. | 348/159 |
| 2006/0192776 A1 * | 8/2006 | Nomura et al. | ............. | 345/419 |
| 2007/0085913 A1 * | 4/2007 | Ketelaars et al. | ............. | 348/239 |
| 2007/0258652 A1 * | 11/2007 | Kazui et al. | ............. | 382/236 |
| 2008/0252717 A1 * | 10/2008 | Moon et al. | ............. | 348/36 |
| 2009/0169052 A1 * | 7/2009 | Seki et al. | ............. | 382/103 |
| 2010/0149368 A1 * | 6/2010 | Yamashita et al. | ............. | 348/222.1 |
| 2010/0296704 A1 * | 11/2010 | Hampapur et al. | ............. | 382/103 |
| 2011/0080487 A1 * | 4/2011 | Venkataraman et al. | .. | 348/218.1 |
| 2012/0151562 A1 * | 6/2012 | Ortiz et al. | ............. | 726/4 |
| 2012/0268555 A1 * | 10/2012 | Yamashita et al. | ............. | 348/37 |

FOREIGN PATENT DOCUMENTS

| | | |
|---|---|---|
| JP | 2005-321902 | 11/2005 |
| JP | 2005-328497 | 11/2005 |
| JP | 2006-217478 | 8/2006 |
| JP | 3925299 | 3/2007 |
| JP | 3928222 | 3/2007 |
| JP | 2008-117235 | 5/2008 |

OTHER PUBLICATIONS

Japanese Office Action dated Aug. 28, 2012 for Japanese Application No. 2008-258114.

* cited by examiner

*Primary Examiner* — Lin Ye
*Assistant Examiner* — John H Morehead, III
(74) *Attorney, Agent, or Firm* — Dentons US LLP

(57) ABSTRACT

An imaging apparatus includes: an imaging device capturing a subject image through an optical system; an image signal processor having a function of combining multiple captured images into a single image, the images being captured during the period when the imaging apparatus is moved; and a control unit, wherein the image signal processor detects any effect of parallax or a moving subject based on the similarity among motion vectors between adjacent images, and the control unit issues a warning when the image signal processor detects any effect of the moving object or parallax to prompt image recapturing.

12 Claims, 20 Drawing Sheets

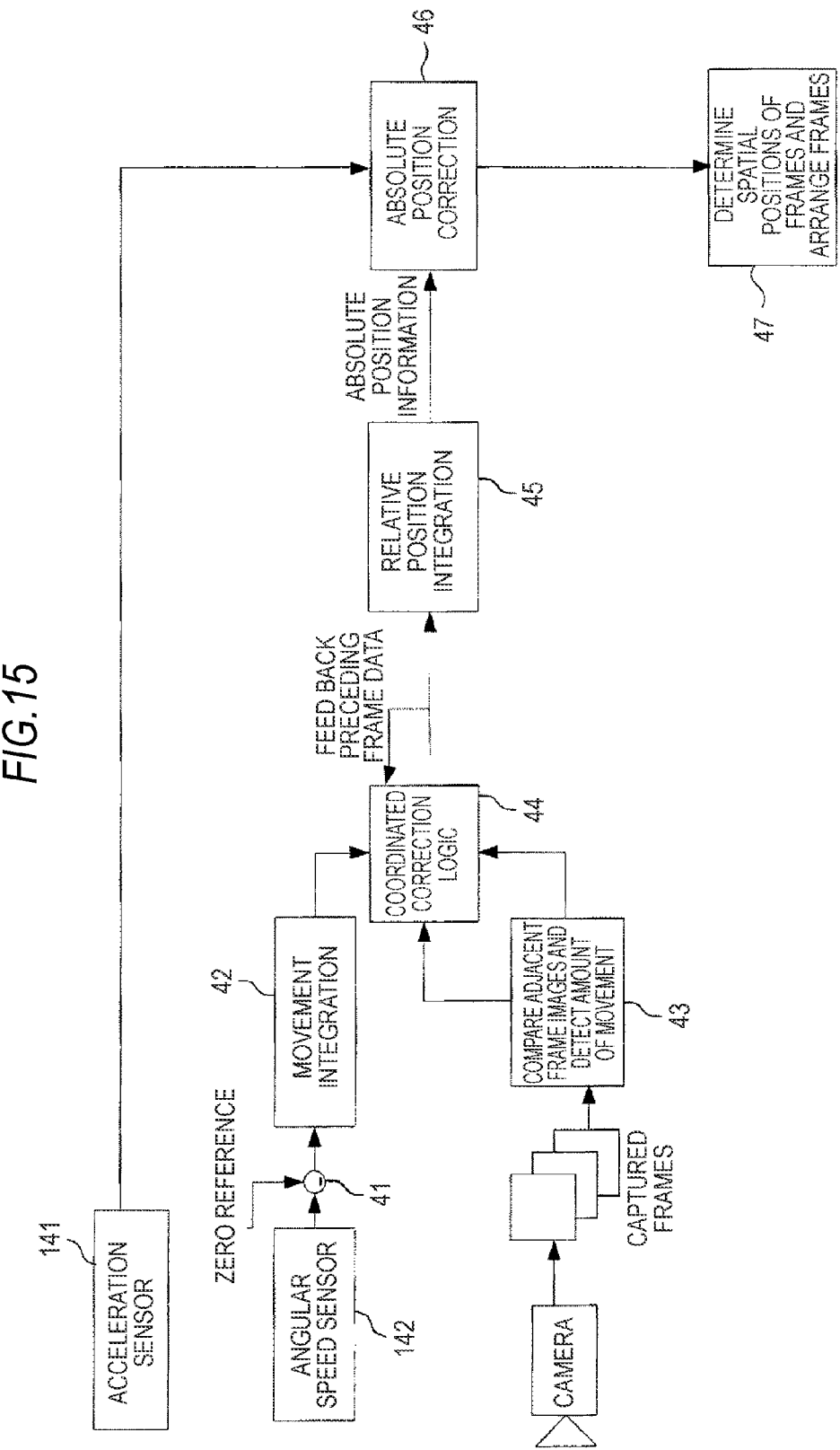

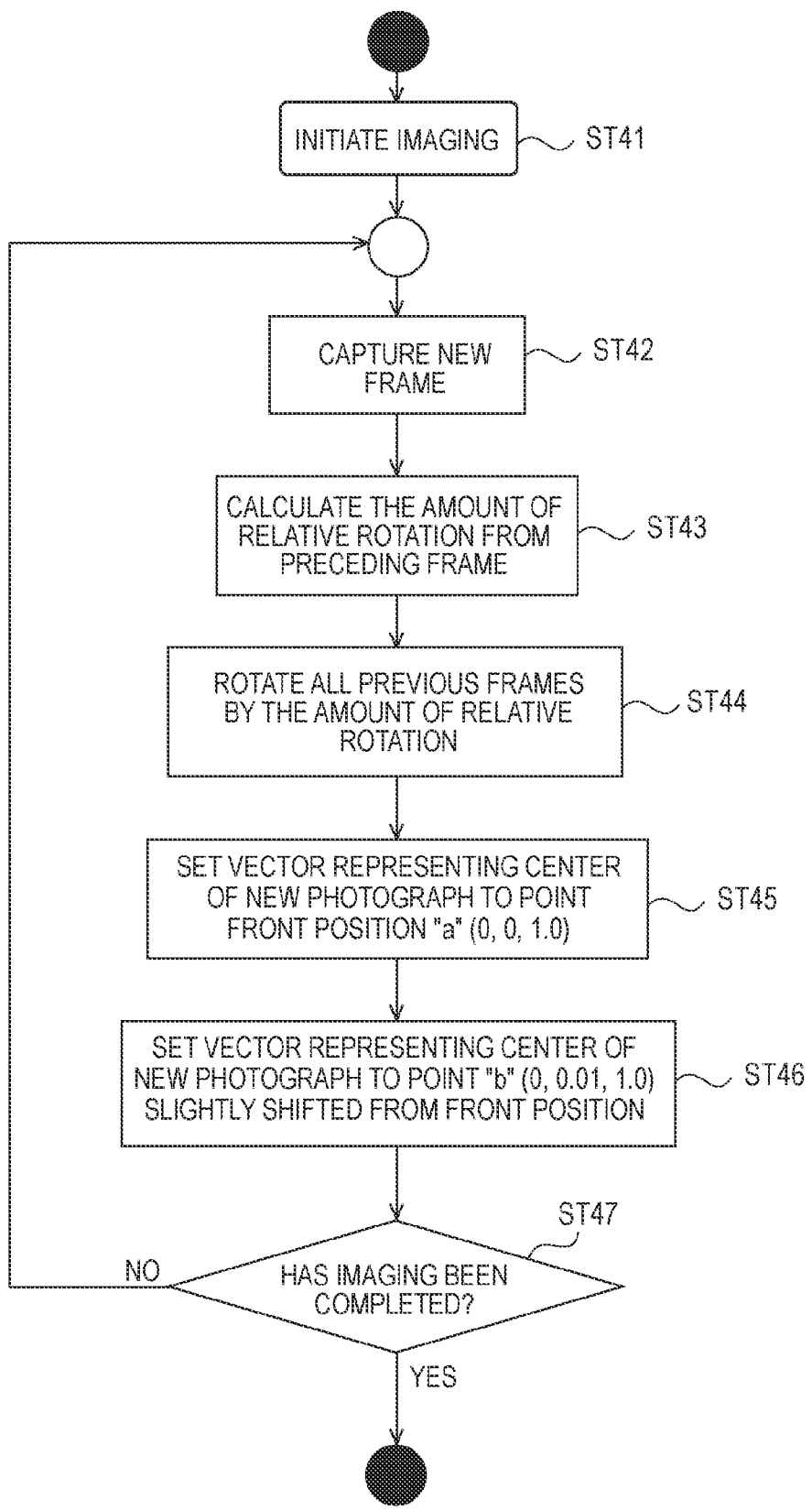

FIG.22A

| | | | WHEN THE NUMBER OF PIXELS IS 10 MILLION | pi= | 3.1416 | rad= | 0.017 | | | | |
|---|---|---|---|---|---|---|---|---|---|---|---|
| | | | | [1] | [2] | [3] | [4] | [5] | [6] | | |
| | | | | INDEPENDENT VARIABLE | DEPENDENT VARIABLE (OUTPUT DATA) | INDEPENDENT VARIABLE | DEPENDENT VARIABLE | INDEPENDENT VARIABLE | DEPENDENT VARIABLE | INDEPENDENT VARIABLE | DEPENDENT VARIABLE | INDEPENDENT VARIABLE | DEPENDENT VARIABLE | INDEPENDENT COMPUTATION EQUATION | REMARKS |
| HORIZONTAL ANGLE OF VIEW | th | [DEGREE] | (INPUT DATA) | 50 | 50 | | 50 | | 50 | | | |
| THE NUMBER OF HORIZONTAL PIXELS | H | [PIXEL] | | 3560 | 3560 | | 3560 | | 3560 | | | |
| VERTICAL ANGLE OF VIEW AND PIXEL DENSITY ARE COMPUTED AS FOLLOWS, PROVIDED THAT HORIZONTAL ANGLE OF VIEW AND THE NUMBER OF HORIZONTAL PIXELS ARE DETERMINED. | | | | | | | | | | | | |
| VERTICAL ANGLE OF VIEW | tv | [DEGREE] | | 38.553 | 38.553 | 38.55 | 38.55 | 38.553 | 38.553 | 2 * atan(3/4 * tan(th/2)) | |
| PIXEL DENSITY | d | [PIXEL/ DEGREE] | | 71.2 | 71.2 | 71.2 | 71.2 | 71.2 | 71.2 | H/th | NOT EXACT |
| THE NUMBER OF VERTICAL LINES | n | [LINE] | | 400 | 400 | 200 | 200 | 100 | 100 | | |
| VERTICAL ANGLE OF VIEW AND THE TOTAL NUMBER OF PIXELS IN SINGLE IMAGE ARE COMPUTED AS FOLLOWS, PROVIDED THAT THE NUMBER OF VERTICAL LINES IS DETERMINED. | | | | | | | | | | | | |
| VERTICAL ANGLE OF VIEW | ttv | [DEGREE] | | 5.618 | 5.618 | 2.809 | 2.809 | 1.4045 | 1.4045 | n/d | NOT EXACT |
| THE TOTAL NUMBER OF PIXELS IN SINGLE IMAGE | s | [MILLION PIXELS] | | 142.4 | 142.4 | 71.2 | 71.2 | 35.6 | 35.6 | H * n /10000 | |
| MEMORY CAPACITY FOR SINGLE IMAGE (BMP) | g1 | [MB] | | 4.272 | 4.272 | 2.136 | 2.136 | 1.068 | 1.068 | 3 * s/100 | |

FIG.22B

ROTATE IMAGING DEVICE 90 DEGREES AND CAPTURE IMAGES WHILE SWEEPING IMAGING DEVICE IN TRANSVERSE DIRECTION WITH LONGER SIDE KEPT VERTICAL.

BLUR-OCCURRING ANGLE AND THE NUMBER OF BLURRED PIXELS ARE COMPUTED AS FOLLOWS, PROVIDED THAT PAN SPEED AND EXPOSURE TIME ARE DETERMINED.

| WHEN THE NUMBER OF PIXELS IS 10 MILLION | | pi= | 3.1416 | rad= | 0.017 | | | |
|---|---|---|---|---|---|---|---|---|
| | | [1] | [2] | [3] | [4] | [5] | [6] | |
| | | INDEPENDENT VARIABLE (INPUT DATA) | DEPENDENT VARIABLE (OUTPUT DATA) | INDEPENDENT VARIABLE | INDEPENDENT VARIABLE | INDEPENDENT VARIABLE | INDEPENDENT VARIABLE | DEPENDENT VARIABLE | COMPUTATION EQUATION | REMARKS |
| PAN SPEED | vp [DEGREE/SEC] | 68 | | 21 | 109 | 24 | 157 | 26 | | |
| EXPOSURE TIME | ts [msec] | 1 | | 10 | 1 | 10 | 1 | 10 | | 1/1000SEC |
| BLUR-OCCURRING ANGLE | ab [DEGREE] | | 0.068 | 0.21 | 0.109 | 0.24 | 0.157 | | 0.26 | vp * ts /1000 | |
| THE NUMBER OF BLURRED PIXELS | nb [PIXEL] | | 4.8416 | 14.952 | 7.761 | 17.09 | 11.178 | 18.512 | ab * d | CORRECTABLE |
| OVERLAPPING RATE | k [%] | 20 | 20 | 30 | 30 | 40 | 40 | | | |

FIG.22C

| | | | pi= | 3.1416 | rad= | 0.017 | | | |
|---|---|---|---|---|---|---|---|---|---|
| | WHEN THE NUMBER OF PIXELS IS 10 MILLION | | [1] INDEPENDENT VARIABLE (INPUT DATA) | [2] DEPENDENT VARIABLE (OUTPUT DATA) | [3] INDEPENDENT VARIABLE | [3] DEPENDENT VARIABLE | [4] INDEPENDENT VARIABLE | [4] DEPENDENT VARIABLE | [5] INDEPENDENT VARIABLE | [5] DEPENDENT VARIABLE | [6] INDEPENDENT VARIABLE | [6] DEPENDENT VARIABLE | COMPUTATION EQUATION | REMARKS |

PERIOD NECESSARY TO MOVE SINGLE SCREEN AND FRAME RATE ARE COMPUTED AS FOLLOWS, PROVIDED THAT OVERLAPPING RATE IS DETERMINED.

| Row | Symbol | Unit | [1] indep | [2] dep | [3] indep | [3] dep | [4] indep | [4] dep | [5] indep | [5] dep | [6] indep | [6] dep | Equation | Remarks |
|---|---|---|---|---|---|---|---|---|---|---|---|---|---|---|
| PERIOD NECESSARY TO MOVE SINGLE SCREEN | T | [SEC] | | 0.0661 | | 0.214 | | 0.018 | | 0.082 | | 0.0054 | | 0.0324 | (100-k)/100 * ttv/vp |
| FRAME RATE | f | [fps] | | 15.13 | | 4.6725 | | 55.43 | | 12.21 | | 186.31 | | 30.853 | 1/T |
| THE NUMBER OF IMAGES IN TRANSVERSE DIRECTION | nx | | 27 | | 27 | | 61 | | | | | 142 | | | |
| CAPACITY OF BUFFER MEMORY | g2 | [MB] | | 115.34 | | 115.34 | | 130.3 | | 130.3 | | 151.66 | | 151.66 | g1 * nx |

TRANSVERSE RANGE, IMAGING PERIOD, THE NUMBER OF TRANSVERSE PIXELS, AND THE TOTAL NUMBER OF PIXELS ARE COMPUTED AS FOLLOWS, PROVIDED THAT THE NUMBER OF IMAGES IN TRANSVERSE DIRECTION IS DETERMINED.

| TRANSVERSE RANGE | w | [DEGREE] | | 122.47 | | 122.47 | | 120.8 | | 120.8 | | 120.22 | | 120.22 | ((100-k)/100 * (nx-1)+1) * ttv |
| IMAGING PERIOD | tx | [SEC] | | 1.7845 | | 5.7785 | | 1.1 | | 4.998 | | 0.7622 | | 4.6024 | nx * T |
| THE NUMBER OF TRANSVERSE PIXELS | px | [PIXEL] | | 8720 | | 8720 | | 8600 | | 8600 | | 8560 | | 8560 | w * d |
| THE TOTAL NUMBER OF PIXELS | M | [MILLION PIXELS] | | 3104.3 | | 3104.3 | | 3062 | | 3062 | | 3047.4 | | 3047.4 | H * px/10000 |

FIG.22D

| | | | pi= | 3.1416 | rad= | 0.017 | | | | |
|---|---|---|---|---|---|---|---|---|---|---|
| | WHEN THE NUMBER OF PIXELS IS 10 MILLION | | [1] INDEPENDENT VARIABLE (INPUT DATA) | [2] DEPENDENT VARIABLE (OUTPUT DATA) | [3] INDEPENDENT VARIABLE | [4] DEPENDENT VARIABLE | [5] INDEPENDENT VARIABLE | [6] DEPENDENT VARIABLE | INDEPENDENT/DEPENDENT VARIABLE | COMPUTATION EQUATION | REMARKS |
| READOUT SPEED | rs | [μ SEC/LINE] | 7.803 | | 7.803 | | 7.803 | | 7.803 | | |
| READOUT TIME IS COMPUTED AS FOLLOWS, PROVIDED THAT READOUT SPEED IS DETERMINED. | | | | | | | | | | | |
| READOUT TIME | tr | [msec] | | 3.1212 | | 1.561 | | 0.7803 | 0.7803 | n * rs | |
| SUM OF READOUT TIME AND EXPOSURE TIME IS PIROUETTE PERIOD. | | | | | | | | | | | |
| PIROUETTE PERIOD | tp | [msec] | 4.1212 | 13.121 | | 2.561 | | 11.56 | 1.7803 | 10.78 ts+tr | |
| BLUR-OCCURRING ANGLE AND THE NUMBER OF BLURRED PIXELS IN THIS PERIOD ARE COMPUTED AS FOLLOWS. | | | | | | | | | | | |
| BLUR-OCCURRING ANGLE | ab2 | [DEGREE] | 0.2802 | 0.2755 | | 0.279 | | 0.277 | 0.2795 | 0.2803 vp * tp /1000 | 0.3 DEGREES OR SMALLER AS GUIDELINE |
| THE NUMBER OF BLURRED PIXELS | nb2 | [PIXEL] | 19.953 | 19.619 | | 19.87 | | 19.75 | 19.901 | 19.956 ab2 * d | 20 OR SMALLER AS GUIDELINE |

PANORAMIC IMAGING APPARATUS, IMAGING METHOD, AND PROGRAM WITH WARNING DETECTION

BACKGROUND OF THE INVENTION

1. Field of the Invention

The present invention relates to an imaging apparatus, an imaging method, and a program having a function of combining multiple images.

2. Description of the Related Art

When a camcorder, a digital still camera, or any other suitable apparatus is used to perform panorama imaging, it is necessary to keep the camera stationary whenever an image is captured, or it is necessary to move the camera slowly so that images are not blurred when the camera is moved and images are captured at the same time.

In the latter case, a high-speed shutter is also necessary to capture images.

In contrast, Japanese Patent No. 3,928,222 proposes a method for capturing images while moving a camera rapidly with the image resolution maintained.

In the technique proposed in Japanese Patent No. 3,928,222, the direction in which the camera is moved and the angular speed at which the camera is moved are detected and the optical axis is moved in the direction opposite to the movement of the camera at the same angular speed so that each image will not change. As a result, each image is captured as if only a single point is viewed.

An acceleration sensor and an angular speed sensor are in some cases necessary to achieve the control method described above. In contrast, Japanese Patent No. 3,925,299 proposes a method for appropriately controlling the optical axis without the two sensors and a feedback circuit for controlling them.

The method proposed in Japanese Patent No. 3,925,299 is used as a monitoring system in which the number of pulses of a stepper motor used to control the imaging direction is counted and the optical axis is controlled based on the count.

SUMMARY OF THE INVENTION

In a method for capturing images from a single point with a camera set to a telescopic mode by changing the imaging direction multiple times to create a wide-angled, high-definition photograph, the imaging operation is typically carried out with the camera placed on an active panhead fixed on a tripod. Alternatively, the camera can be held by hands to do the same job.

However, when images are captured by holding the camera by hands and rotating it around the shoulder of the user, parallax greatly affects the captured images because the camera is rotated around a position fairly behind the viewpoint of the camera, from which the camera views a subject.

In this case, there will be virtually no problem when only remote scenery is imaged, but images may not be combined correctly when the captured images contain a near subject, because the positional relationship of the near subject between adjacent images differs from that of a remote subject.

Since no current camera can control (monitor) the effect of parallax or a moving subject, it is not possible to judge whether or not images need to be recaptured immediately after the imaging operation is completed.

Thus, it is desirable to provide an imaging apparatus, an imaging method, and a program capable of judging whether or not images need to be recaptured immediately after the imaging operation is completed and hence providing ease of operation.

An imaging apparatus according to a first embodiment of the invention includes an imaging device capturing a subject image through an optical system, an image signal processor having a function of combining multiple captured images into a single image, the images being captured during the period when the imaging apparatus is moved, and a control unit. The image signal processor detects any effect of parallax or a moving subject based on the similarity among motion vectors between adjacent images, and the control unit issues a warning when the image signal processor detects any effect of parallax or the moving object to prompt image recapturing.

It is preferred that the image signal processor carries out multiple motion detection operations in the area where two temporally adjacent images overlap with each other to determine multiple motion vectors, and recognizes that parallax is detected when vectors having different values are present.

It is preferred that the image signal processor carries out multiple motion detection operations in the area where two temporally adjacent images overlap with each other to determine multiple motion vectors, and the control unit issues a warning without distinguishing between parallax and a moving subject at the boundary between a moving object and a stationary subject.

It is preferred that the control unit controls an operation of capturing several images at a fixed overlapping rate at which any part of the subject appears in at least two adjacent images.

An imaging method according to a second embodiment of the invention includes the steps of capturing subject images with an imaging device through an optical system while moving an imaging apparatus, detecting any effect of parallax or a moving subject based on the similarity among motion vectors between adjacent images, and issuing a warning when any effect of parallax or the moving object is detected to prompt image recapturing.

A program according to a third embodiment of the invention causes a computer to carry out imaging processes, the imaging processes including the processes of capturing subject images with an imaging device through an optical system while moving an imaging apparatus, detecting any effect of parallax or a moving subject based on the similarity among motion vectors between adjacent images, and issuing a warning when any effect of parallax or the moving object is detected to prompt image recapturing.

According to the embodiments of the invention, multiple images captured during the period when the imaging apparatus is moved are inputted to the image signal processor.

The image signal processor detects any effect of parallax or a moving subject based on the similarity among motion vectors between adjacent images, and outputs the detection result to the control unit.

The control unit issues a warning when the image signal processor detects any effect of parallax or the moving object to prompt image recapturing.

The embodiments of the invention allow judgment of whether or not images need to be recaptured immediately after the imaging operation is completed and improvement in ease of operation.

BRIEF DESCRIPTION OF THE DRAWINGS

FIG. 15 is a functional block diagram showing a spatial arrangement method based on successively captured images and sensor information;

FIG. 21 is a flowchart of a method for assigning spatial coordinates by using captured photographs; and FIGS. 22A to 22D describe an example of computation of a sweep speed.

DESCRIPTION OF THE PREFERRED EMBODIMENTS

An embodiment of the invention will be described below with reference to the drawings.

Figure 1:
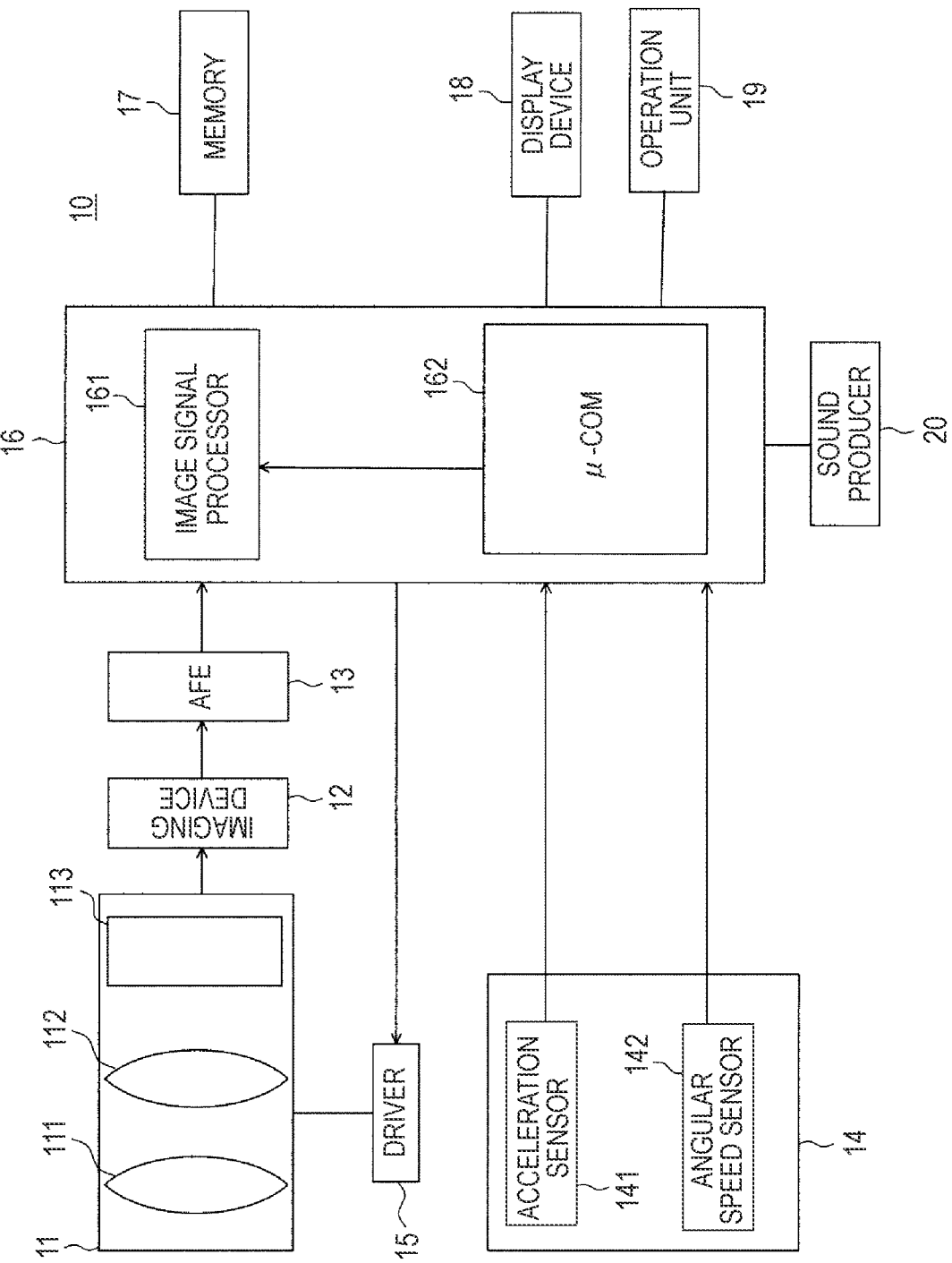
FIG. 1 is a block diagram showing an example of the configuration of a camera apparatus that employs an imaging processing apparatus according to an embodiment of the invention.

FIG. 1 is a block diagram showing an example of the configuration of a camera apparatus as an imaging apparatus according to the embodiment of the invention.

Figure 2:
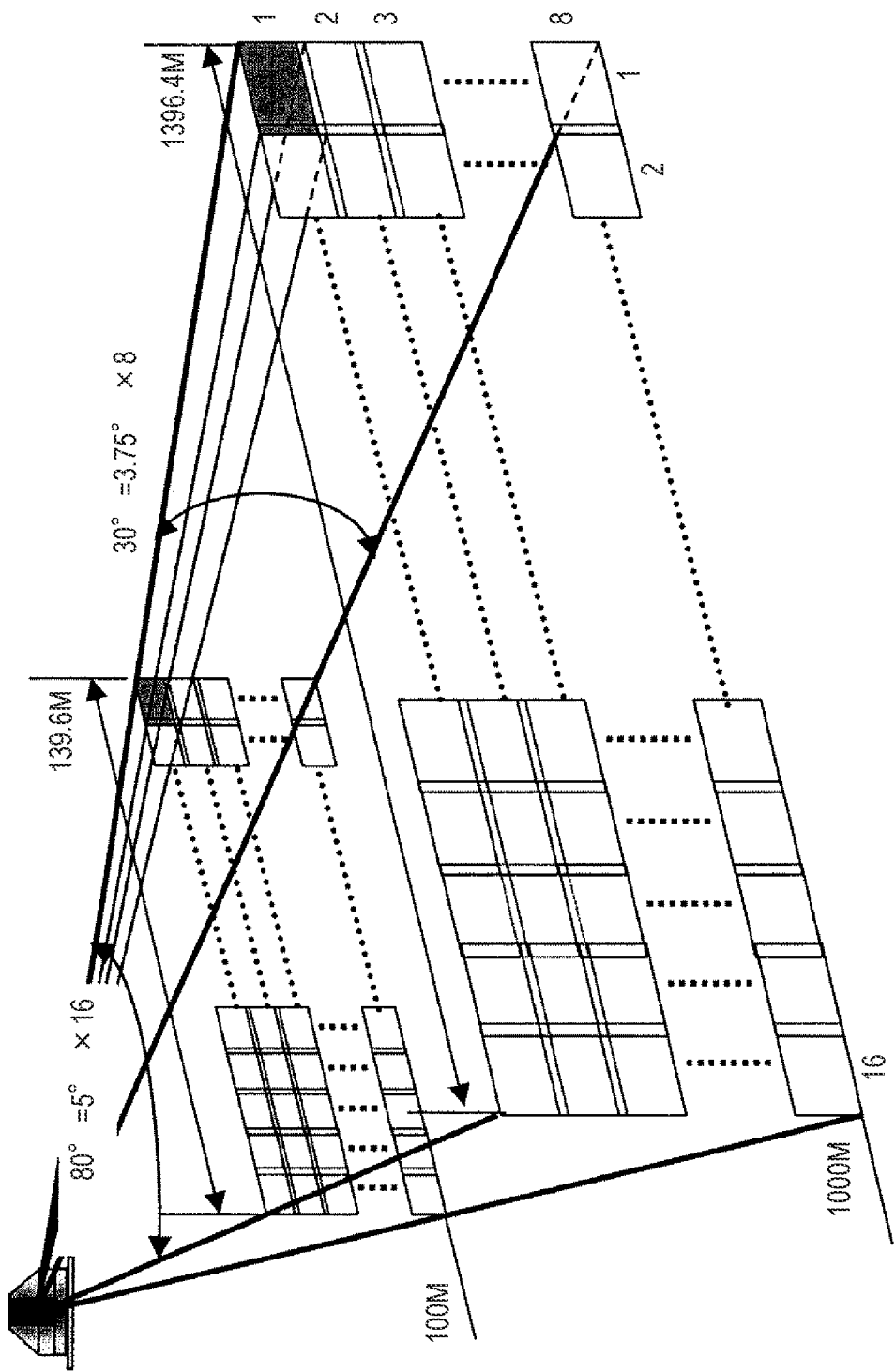
FIG. 2 conceptually shows wide-angle imaging performed with the camera apparatus according to the present embodiment.

The camera apparatus 10 can produce, for example, as shown in FIG. 2, a large number of images (16×8=128 in FIG. 2) captured from a single point by automatically or manually changing the imaging direction multiple times.

The camera apparatus 10 is configured to accurately and seamlessly combine a large number of images, for example, several thousands of images, to form what is called a panoramic image.

That is, the camera apparatus 10 has a function of creating a panoramic picture based on images captured by swinging a digital camera in which a solid-state imaging device, for example, a CMOS image sensor (CIS), is incorporated at a high speed in the longitudinal or transverse direction.

The camera apparatus 10 according to the present embodiment has the following first to fifth characteristic configurations and functions.

A first configuration has the following characteristic points.

To create a panoramic image by moving the camera apparatus 10 to capture multiple images and combining the acquired imaged, the optical axis of a lens that collects image-forming light (shift lens) is controlled in such a way that the direction in which the camera is moved and the angular speed thereof are canceled.

In this way, each image is captured as if only a single point is viewed even when the camera is moved.

In this configuration, a CIS (CMOS Image Sensor) is used as the solid-state imaging device and each image is captured by performing the control described above for central part of the lines of the CIS.

That is, the optical axis is controlled as described above during a period when part of the lines are exposed to light plus a readout time, whereas the optical axis is controlled in such a way that it is brought back to a position in the vicinity of the center at all other times. In this case, the direction in which the camera captures images is perpendicular to the lines of the CIS.

The camera apparatus 10 then produces a panoramic image at a high frame rate by clipping a strip from part of the CIS and performing the optical axis control corresponding to that part without reducing the resolution even when the camera is moved at a high speed.

A second configuration has the following characteristic points.

The camera apparatus 10 employs a technique in which successive images are spatially arranged by using frame movement information obtained by an image recognition technique and movement information from an attitude sensor.

The information from the attitude sensor supplements the information that is not provided by the image recognition. The information from the attitude sensor is used to check whether the image recognition has been successfully carried out or is used as auxiliary coordinates when the image recognition has failed. The spatially arranged images create a single complete panoramic image.

In this case, the camera apparatus 10 is configured as a camera that is primarily held by hands and captures multiple images from a substantially single point by changing the imaging direction.

The attitude sensor of the camera apparatus 10 includes a three-axis (or two-axis) acceleration sensor and/or a three-axis (or two-axis) angular speed sensor.

The camera apparatus 10 has not only a function of capturing images and simultaneously recording attitude information indicating the direction in which each of the images is captured, but also a function of combining the multiple captured images into a single image on the fly.

The camera apparatus 10 not only uses the area where adjacent images overlap with each other along with block matching or any other suitable image recognition function to calculate the relative positional relationship between the images, but also uses data from the attitude sensor, which is formed of a variety of sensors, to calculate the image position relationship.

The camera apparatus 10 then calculates more precise relative positional relationship between the images by using selective coordination between the calculated relative positional relationship and the image position relationship.

Thereafter, the camera apparatus 10 identifies the absolute positional relationship of each image, such as the direction in which the center of the image is oriented, the pan angle (longitude), the tilt angle (latitude), and the roll angle (inclination) representing the rotation around the optical axis, and uses the above information as initial values to perform precise automatic combination.

A third configuration has the following characteristic points.

The camera apparatus 10 employs a technique in which successive images are recorded with the frame movement information obtained by the image recognition technique and the movement information from the attitude sensor related to each other.

The camera apparatus 10 calculates the angle of view per image pixel, the value from the attitude sensor in the stationary state, the relationship between the value from the attitude sensor and the angle of view per pixel, and other information that may not be obtained from only one of the two positional relationships. The camera apparatus 10 has an offset, a gain, and other parameters and can change them to allow the expected direction in which each image is captured to substantially coincide with the actual direction.

The camera apparatus 10 statically detects attitude data in the stationary state in the form of the angle by which the three-axis (or two-axis) acceleration sensor is inclined to the direction of gravity, and sets the data as the initial value of the attitude information.

The camera apparatus 10 calculates mainly the rotary movement of the camera in the longitudinal and transverse directions, for example, by integrating the output values from the three-axis angular speed sensor with respect to time, and sets the resultant values as directional data at the time when each image is captured.

The camera apparatus 10 uses the area where adjacent images overlap with each other along with block matching or any other suitable image recognition means to calculate the positional relationship between the adjacent images. The camera apparatus 10 determines the positional relationship between the adjacent images by computation as described above, but judges whether or not the result is correct or incorrect at the same time.

The camera apparatus 10 calibrates the parameters based on the thus obtained information when the result is judged correct.

The camera apparatus 10 then arranges the images by using the value from the attitude sensor based on the parameters that have been already calibrated when the result is judged incorrect.

A fourth configuration has the following characteristic points.

The camera apparatus 10 has a function of issuing a warning when it detects any effect of a moving object to prompt a user to recapture images.

The camera apparatus 10 has a function of detecting the moving object in such a way that an overlapping rate is set at 50% or higher so that any part of the subject appears in at least two adjacent images. As a result, any effect of parallax or a moving subject is detected based on the similarity among motion vectors between the adjacent images.

That is, the camera apparatus 10 issues a warning when it detects any effect of a moving object or parallax to prompt the user to recapture images.

The camera apparatus 10, which is rapidly swung to capture multiple strip-shaped images of a subject within a wide range and combines them into a single image, detects how much the parallax affects a near subject and prompts the user to recapture images around the viewpoint of the camera, from which the camera views a subject.

A fifth configuration has the following characteristic points.

The camera apparatus 10 notifies an appropriate sweep angular speed (the speed at which the user swings the camera), and issues a warning when the sweep angular speed is too fast. In this way, the user is prompted to recapture images.

The camera apparatus 10 displays the output (sweep angular speed) from the attitude sensor (gyroscopic sensor) in the form of graph on the display device 18, such as the screen of an LCD, with the vertical axis representing the output and the horizontal axis representing time. Since the highest sweep angular speed is determined when the horizontal angle of view, the number of horizontal pixels, and the shutter speed are set, the graph is displayed in such a way that an appropriate range ranges from 60% of the highest sweep angular speed to 80% thereof.

More specific configurations and functions of the camera apparatus 10 having the above features will be described below.

The camera apparatus 10 includes an optical system 11, an imaging device 12, an analog front-end (AFE) circuit 13, an attitude sensor 14, a driver 15, a system controller 16, a memory 17, a display device 18, an operation unit 19, and a sound producer 20.

The optical system 11 forms an image of a subject on the imaging surface of the imaging device 12.

The optical system 11 includes an ordinary lens 111, a shift lens 112 as an optical axis changeable device, and a mechanical shutter 113.

The shift lens 112 not only collects image-forming light but also is driven by the driver 15 to change the direction of the optical axis.

The imaging device 12 is formed of a CMOS (Complementary Metal Oxide Semiconductor) device or a CCD (Charge Coupled Device).

In the description of the present embodiment, a CMOS image sensor is used by way of example. In the first configuration described above, a CMOS image sensor is used as the solid-state imaging device.

In the imaging device 12, optical sensors arranged in a matrix on a semiconductor substrate detect a subject image formed by the optical system 11, produce signal charge, read the signal charge via vertical and horizontal signal lines, and output an image signal of the subject.

When the imaging device 12 is formed of a CMOS image sensor, a global shutter and a rolling shutter are used as an electronic shutter to control light exposure. The light exposure is controlled by the system controller 16.

The AFE circuit 13 removes, for example, fixed pattern noise contained in the image signal from the imaging device 12, uses automatic gain control to stabilize the signal level, and outputs the resultant signal to the system controller 16.

The attitude sensor 14 detects the attitude of the camera apparatus 10 and supplies the detection result to the system controller 16.

The attitude sensor 14 is formed of, for example, a three-axis acceleration sensor 141 and a three-axis angular speed sensor 142.

The acceleration sensor 141 is capable of statically finding the angle thereof with respect to the direction of gravity and detecting the tilt angle and the roll angle but not the pan angle.

The angular speed sensor 142 is therefore used to find the angle of motion. The angular speed sensor 142 is also called a gyroscopic sensor and capable of detecting the angular speed during rotary motion and outputting a voltage signal. Integrating the voltage signal produces an angle. Since the angular speed sensor 142 is a three-axis sensor, the pan, tilt, and roll angles can be detected.

The driver 15 changes the optical axis of the shift lens 112 in the optical system 11 under the control of the system controller 16.

The system controller 16 is a circuit that performs color correction on the output signal from the AFE circuit 13, combines multiple images, performs automatic exposure control, automatic white balance control, and other control operations.

The system controller 16 includes an image signal processor 161 and a microcomputer (μ-COM) 162, which serves as a control unit.

The image signal processor 161 includes a precise combination processor configured to accurately and seamlessly combine a large number of images captured from a single point by changing the imaging direction multiple times.

Figure 3:
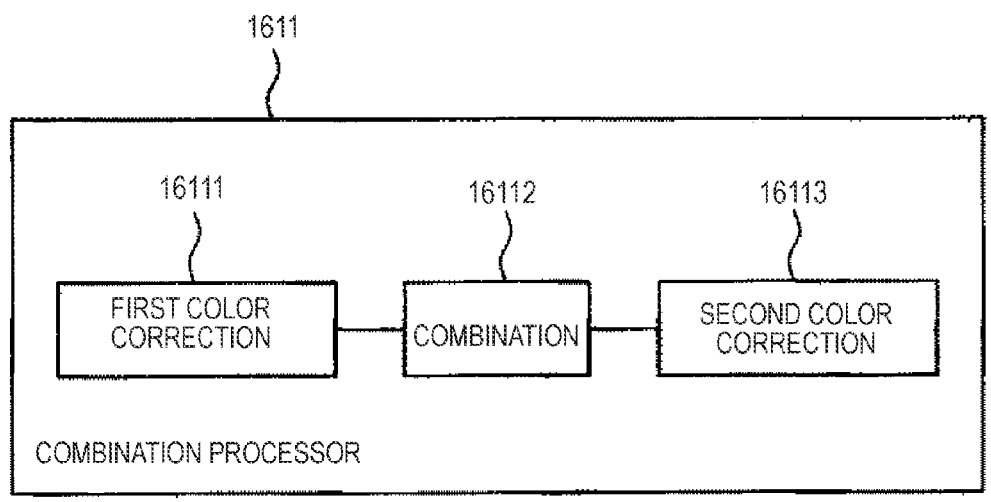
FIG. 3 is a block diagram of a precise combination processor.

As shown in FIG. 3, the precise combination processor 1611 includes a first color correcting function unit 16111, a combining function unit 16112, and a second color correcting function unit 16113.

The image signal processor 161 combines multiple captured images obtained by moving the camera apparatus 10 to produce a panoramic image.

The microcomputer 162 controls the optical axis of the lens that collects image-forming light (shift lens) in accordance with the detection result from the attitude sensor 14 in such a way that the direction in which the camera is moved and the angular speed thereof are canceled.

When a CMOS image sensor is used as the solid-state imaging device, the microcomputer 162 controls the optical axis as described above during a period when central part of the lines of the CMOS image sensor are exposed to light plus a readout time, whereas controlling the driver 15 to bring the optical axis back to a position in the vicinity of the center at all other times. In the latter case, the direction in which the camera captures images is perpendicular to the lines of the CMOS image sensor.

The microcomputer 162 controls a production process of a panoramic image at a high frame rate by clipping a strip from part of the CMOS image sensor and performing the optical axis control corresponding to that part without reducing the resolution even when the camera is moved at a high speed.

The microcomputer 162 integrates the detection signal from the angular speed sensor 142 to calculate the angle of rotation of the camera apparatus 10, and controls how much the optical axis of the shift lens 112 should be changed in accordance with the calculated angle of rotation.

Alternatively, the image signal processor 161 can detect a motion component of adjacent captured images, and the microcomputer 162 can control how much the optical axis should be changed in accordance with the detected motion component.

Still alternatively, the microcomputer 162 can control how much the optical axis should be changed by using both the calculated angle of rotation and the motion component.

The microcomputer 162 records attitude information indicating the direction in which each image is captured in the memory 17.

The image signal processor 161 and the microcomputer 162 not only use the area where adjacent images overlap with each other along with block matching or any other suitable image recognition function to calculate the relative positional relationship between the images, but also use data from the attitude sensor, which is formed of a variety of sensors, to calculate the image position relationship.

The microcomputer 162 calculates more precise relative positional relationship between the images by using selective coordination between the calculated relative positional relationship and the image position relationship.

Thereafter, the microcomputer 162 identifies the absolute positional relationship of each image, such as the direction in which the center of the image is oriented, the pan angle (longitude), the tilt angle (latitude), and the roll angle (inclination) representing the rotation around the optical axis.

The image signal processor 161 uses the above information as initial values to perform precise automatic combination.

The microcomputer 162 calculates the angle of view per image pixel, the value from the attitude sensor in the stationary state, the relationship between the value from the attitude sensor and the angle of view per pixel, and other information that may not be obtained from only one of the two positional relationships. The microcomputer 162 has an offset, a gain, and other parameters and can change them to allow the expected direction in which each image is captured to substantially coincide with the actual direction.

The microcomputer 162 statically detects attitude data in the stationary state in the form of the angle by which the three-axis (or two-axis) acceleration sensor is inclined to the direction of gravity, and sets the data as the initial value of the attitude information.

The microcomputer 162 calculates mainly the rotary movement of the camera in the longitudinal and transverse directions, for example, by integrating the output values from the three-axis angular speed sensor 142 with respect to time, and sets the resultant values as directional data at the time when each image is captured.

The microcomputer 162 uses the area where adjacent images overlap with each other along with block matching or any other suitable image recognition function to calculate the positional relationship between the adjacent images. The microcomputer 162 determines the positional relationship between the adjacent images by computation as described above, but judges whether or not the result is correct or incorrect at the same time.

The microcomputer 162 calibrates the parameters based on the thus obtained information when the result is judged correct.

The microcomputer 162 then arranges the images by using the value from the attitude sensor based on the parameters that have been already calibrated when the result is judged incorrect.

When any effect of a moving object is detected, the microcomputer 162 instructs the display device 18 and/or the sound producer 20 to issue a display and/or a warning sound. In this way, the user is prompted to recapture images.

The microcomputer 162 detects the moving object in such a way that the overlapping rate is set at 50% or higher so that any part of the subject appears in at least two adjacent images. As a result, any effect of parallax or a moving subject is detected based on the similarity among motion vectors between the adjacent images.

That is, the microcomputer 162 issues a warning when it detects any effect of a moving object or parallax to prompt the user to recapture images.

The microcomputer 162 detects how much the parallax affects a near subject and prompts the user to recapture images around the viewpoint of the camera, from which the camera views a subject.

The microcomputer 162 notifies an appropriate sweep angular speed (the speed at which the user swings the camera), and instructs the display device 18 and/or the sound producer 20 to issue a display and/or a warning sound when the sweep angular speed is too fast. In this way, the user is prompted to recapture images.

The microprocessor 162 displays the output (sweep angular speed) from the attitude sensor (gyroscopic sensor) in the form of graph on the display device 18, such as the screen of an LCD, with the vertical axis representing the output and the horizontal axis representing time. Since the highest sweep angular speed is determined when the horizontal angle of view, the number of horizontal pixels, and the shutter speed are set, the graph is displayed as shown in FIG. 4, in which the appropriate range RNG ranges from 60% of the highest sweep angular speed to 80% thereof.

A schematic procedure of the above operation is shown below.

[1] Press a start button in the operation unit 19 and rotate the camera. Then, release the start button.

Figure 4:
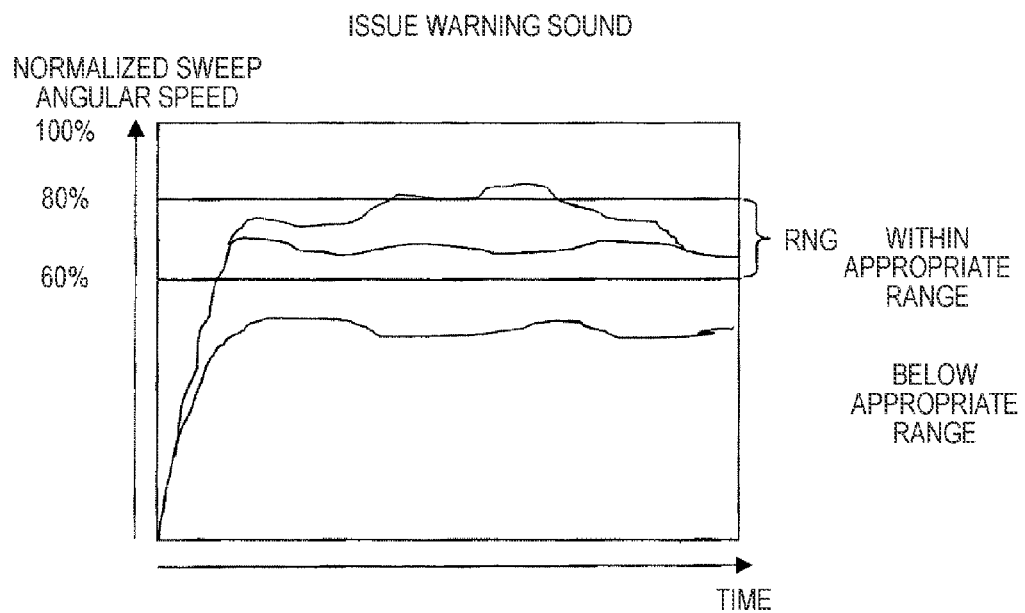
FIG. 4 shows the output (sweep angular speed) from an attitude sensor displayed in the form of graph.

[2] The sweep angular speed is displayed on the screen of the display device 18 as long as the start button is being pressed, as shown in FIG. 4.

[3] When the sweep angular speed is slower than the lower limit of the appropriate range RNG, no warning will be issued, whereas a warning sound will be produced when the sweep angular speed is faster, even instantaneously, than the upper limit of the appropriate range RNG.

The first to fifth configurations described above will be specifically described below.

Primary part of the control in each of the first to fifth configurations is performed by the system controller 16.

[First Configuration]

In the first configuration, since a CMOS image sensor is used as the solid-state imaging device, the frame/field methodology is not applied, but the progressive scheme, in which all lines are sequentially read, is used.

Figure 5A:
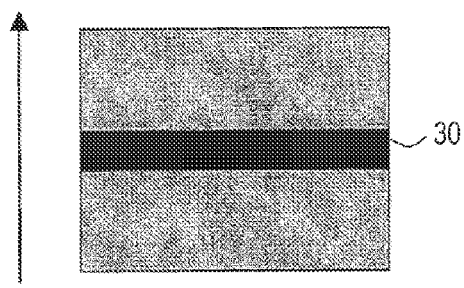
FIGS. 5A and 5B describe how images are captured in a first configuration of the present embodiment.
Figure 5B:
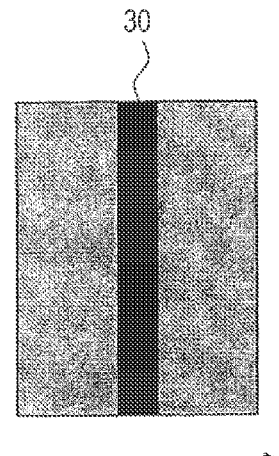

FIGS. 5A and 5B describe how images are captured in the first configuration of the present embodiment.

The camera apparatus 10 is assumed to be basically moved in the following way: The camera apparatus 10 is vertically rotated as shown in FIG. 5A or horizontally rotated as shown in FIG. 5B. That is, the camera is moved in the direction perpendicular to the readout lines of the CMOS image sensor.

Further, in the present embodiment, the microcomputer 162 performs the optical axis control on a strip obtained by clipping a central portion of the imaging range of the CMOS image sensor, as indicated by the dark strip 30 in FIGS. 5A and 5B.

Capturing a strip-shaped image as described above provides the following advantages.

(a) The effect of parallax is advantageously reduced as the width of the strip is reduced.

(b) The effect of non-simultaneous readout from the CMOS image sensor is also advantageously reduced as the width of the strip is reduced.

(c) The effect of reduction in the amount of light at the periphery is also advantageously reduced.

(d) The effect of lens distortion is also advantageously reduced.

The microcomputer 162 controls the optical axis of the lens that collects image-forming light (shift lens) in accordance with, for example, the detection result from the attitude sensor 14 in such a way that the direction in which the camera is moved and the angular speed thereof are canceled.

When a CMOS image sensor is used as the solid-state imaging device, the microcomputer 162 controls the optical axis as described above during a period when central part of the lines of the CMOS image sensor are exposed to light plus a readout time, whereas the microcomputer 162 controls the driver 15 to bring the optical axis back to a position in the vicinity of the center at all other times.

That is, it is necessary to control the optical axis during the period when the strip 30 shown in FIGS. 5A and 5B is exposed to light.

Figure 6:
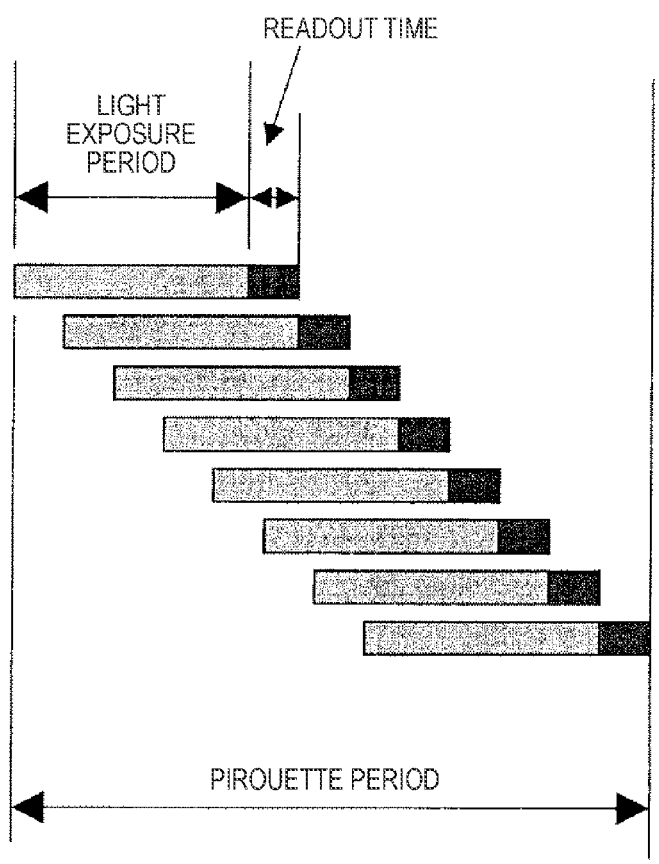
FIG. 6 shows the relationship among the period during which a CMOS image sensor is exposed to light, the period during which the accumulated charge is read, and the period during which the optical axis is controlled.

FIG. 6 shows the relationship among the period during which the CMOS image sensor is exposed to light, the period during which the accumulated charge is read, and the period during which the optical axis is controlled.

For each of the lines of the CMOS image sensor, the line is exposed to light and the charge is read. After the readout operation is carried out for a line, the following line is exposed to light and the charge is read. The optical axis is controlled during the period when this operation is repeated to process the charge all over the strip.

For example, when the shutter speed is $1/1000$ seconds (that is, the exposure time is 1 msec) and the width of the strip corresponds to 200 lines, the readout time shown in FIG. 6 is 1.56 msec and the optical axis control period is 2.56 msec. For reference, when the variables Son and Soff in FIG. 3 in corresponding Japanese Patent No. 3,928,222, in which the frame rate at which images are captured is 60 fps (approximately 16.66 msec per image), are considered, Son is 2.56 msec and Soff is 16.66−2.56=14.1 msec.

In Japanese Patent No. 3,928,222, the angular limits between which the optical axis is controlled are ±1.2 degrees. In the present embodiment, any value ranging from 0 to 0.3 degrees is used as the angular limit although the angular limits can be, for example, within ±0.5 degrees. The angle of 0.3 degrees is approximately 60% of the maximum value of the range within which the angular limit can be selected.

The thus captured strip-shaped images are combined in the precise combination processor 1611 in FIG. 3 to produce a panoramic picture. The image combining process performed in the precise combination processor 1611 will be described below.

The system controller 16 according to the present embodiment has a function (software, for example) of precisely combining images captured from a single point by changing the imaging direction multiple times into a single image with color unevenness corrected.

Characteristic functional portions of the precise combination in the present embodiment will be specifically described below.

To extract a lens distortion correction coefficient and other parameters, the first color correcting function unit 16111 performs at least three block matching (BM) operations for each boundary, and at least four boundaries are used for combination. The lens distortion correction coefficient is determined in such a way that the boundaries are as accurate as possible.

In other words, the first color correcting function unit 16111 extracts the lens distortion correction coefficient and other parameters from raw images.

The first color correcting function unit 16111 then performs peripheral light reduction correction, contrast enhancement, chroma enhancement, and gamma correction uniformly on all sub-images.

After the first color correcting function unit 16111 has determined the lens distortion correction coefficient and other parameters and performed peripheral light reduction correction, contrast enhancement, chroma enhancement, and gamma correction, the combining function unit 16112 carries out at least one (three, for example) BM (block matching) operation for all boundaries.

The combining function unit 16112 evaluates the BM results for all the boundaries simultaneously, updates the optical axis direction in such a way that errors produced at all the boundaries decrease, thus reduces the errors, and precisely combines the multiple images.

The second color correcting function unit 16113 performs color (unevenness) correction independently on all the sub-images to reduce the difference in color between adjacent images among the multiple images precisely combined by the combining function unit 16112.

Further, the second color correcting function unit 16113 performs color correction for reducing the discontinuity in color between adjacent images to a level at which the discontinuity is invisible.

A theoretical concept of the precise combination performed in the precise combination processor 1611 will now be described.

The present embodiment basically employs a phase correlation technique based on Fourier analysis.

That is, the present embodiment employs a technique based on the Fourier shift theorem, in which a shift of a spatial function only changes the phase in the spectral region.

That is, it is assumed that two functions $f_1$ and $f_2$ satisfy the following relationship.

$$f_2(x,y) = f_1(x+x_t, y+y_t) \quad \text{[Equation 1]}$$

Further, the two functions have the following spectral characteristic.

$$F_2(u,v) = F_1(u,v) \exp(-2\pi i(ux_t + vy_t)) \quad \text{[Equation 2]}$$

The above equation can be rewritten to the following equivalent equation by using a cross-power spectrum (CPS).

$$\underbrace{\frac{F_1(u,v)F_2^*(u,v)}{|F_1(u,v)F_2^*(u,v)|}}_{\text{Cross-power spectrum}} = \exp(2\pi i(ux_t + vy_t)), \quad \text{[Equation 3]}$$

wherein $F_2^*$ represents a conjugate function of the complex function $F_2$.

Figure 7A:
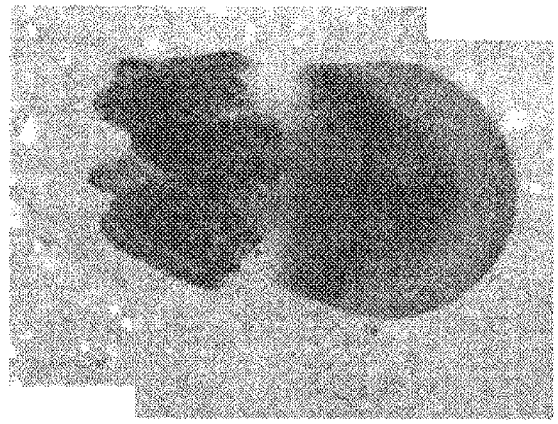
FIGS. 7A and 7B show a stitched image obtained by a cross-power spectrum (CPS)-based translation.
Figure 7B:
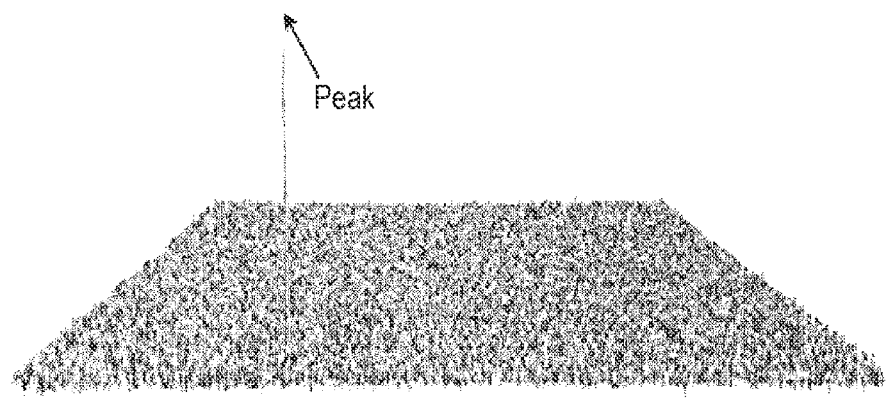

In practice, an image is formed of bit noise, like a cross-power spectrum between two images, as shown in FIGS. 7A and 7B.

It is therefore desirable to find a peak of the cross-power spectrum (CPS) and then derive a translation parameter ($x_t$, $y_t$).

FIGS. 7A and 7B show a stitched image obtained by a cross-power spectrum (CPS)-based translation.

FIG. 7A shows the result of stitching two images. Two-dimensional translation is carried out by detecting a peak of a cross-power spectrum (CPS), as shown in FIG. 7B. The images completely match with each other when the cross-power spectrum (CPS) can be read.

Since it is difficult to detect an optimum peak in an image having a large amount of noise, several peaks may be used to select an optimum peak.

A principle of extracting parameters by using BM (block matching) will next be described with reference to FIGS. 8 to 14A and 14B.

It is noted that BM includes a function of deriving a peak of a cross-power spectrum (CPS) described above.

Figure 8:
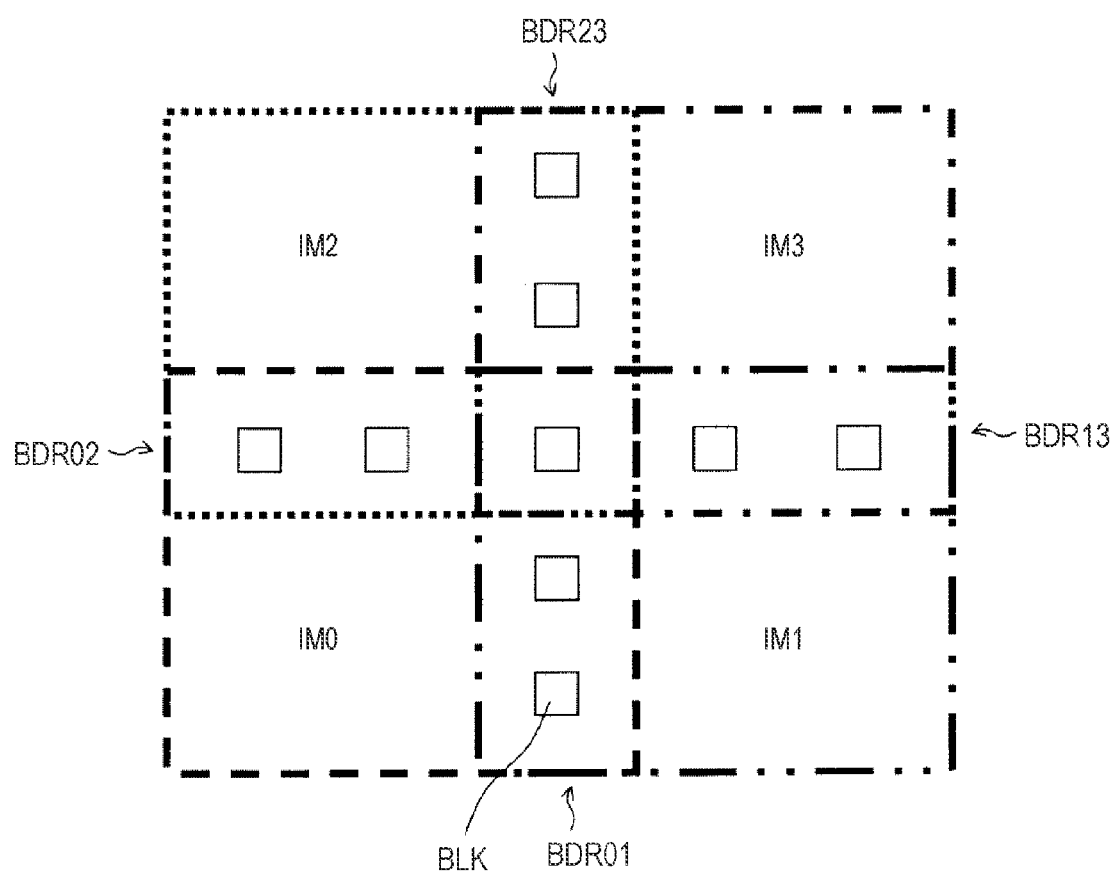
FIG. 8 describes a process of extracting parameters by using block matching (BM) and shows a process of selecting four images in good conditions.

First, four images IM0, IM1, IM2, and IM3 in good conditions are selected, as shown in FIG. 8.

For example, the lower left image is called a zeroth image IM0, and the lower right image is called a first image IM1. Similarly, the upper left image is called a second image IM2, and the upper right image is called a third image IM3. The images IM0 to IM3 are arranged in such a way that adjacent images have an overlapping portion at the boundary therebetween.

In FIG. 8, each of the rectangles arranged along the boundaries represents a block BLK.

BM (block matching) is carried out under the arrangement condition described above.

The lens distortion, the angle of view, the tilt angle, and other information are extracted from the four (up, down, right, and left) boundaries BDR01, BDR02, BDR13, and BDR23.

BM (block matching) will be further described.

Figure 9:
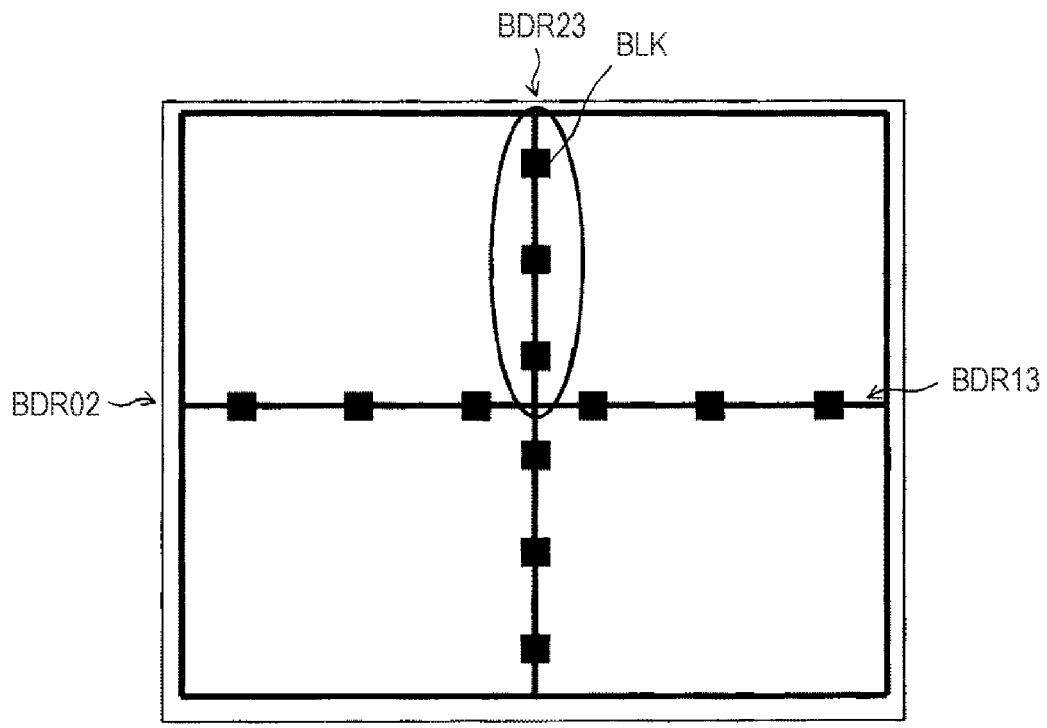
FIG. 9 describes a process of extracting parameters by using block matching (BM) and shows an example in which BM is carried out at three locations along a single boundary.

BM is carried out at three locations along a single boundary, for example, as shown in FIG. 9.

Figure 10:
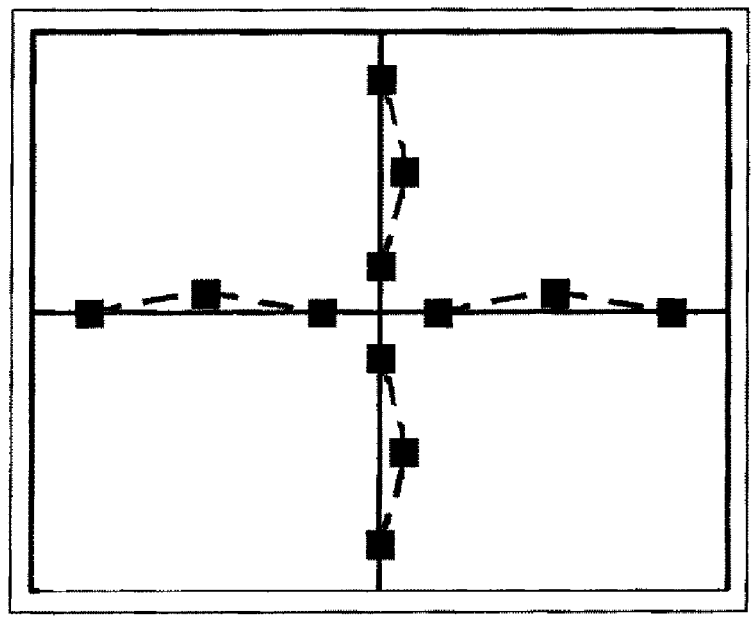
FIG. 10 describes a process of extracting parameters by using block matching (BM) and shows that BM results in curved boundaries when lens distortion is present.

When lens distortion is present, BM results in curved boundaries, as shown in FIG. 10.

Figure 11:
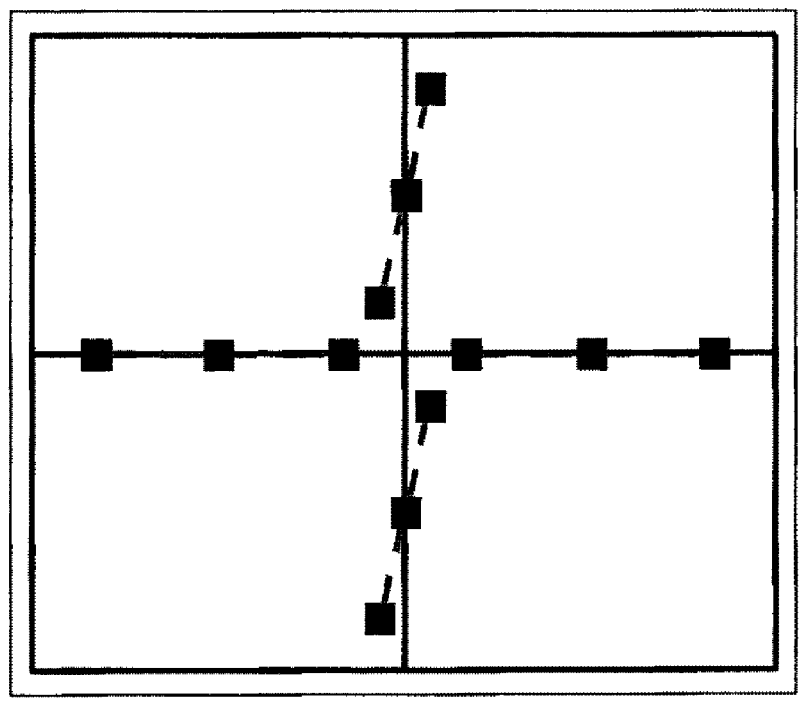
FIG. 11 describes a process of extracting parameters by using block matching (BM) and shows an example in which erroneous boundaries inclined to the right-left direction are produced when the tilt angle is incorrect.

When the tilt angle is incorrect, BM results in erroneous boundaries inclined to the right-left direction, as shown in FIG. 11.

Figure 12:
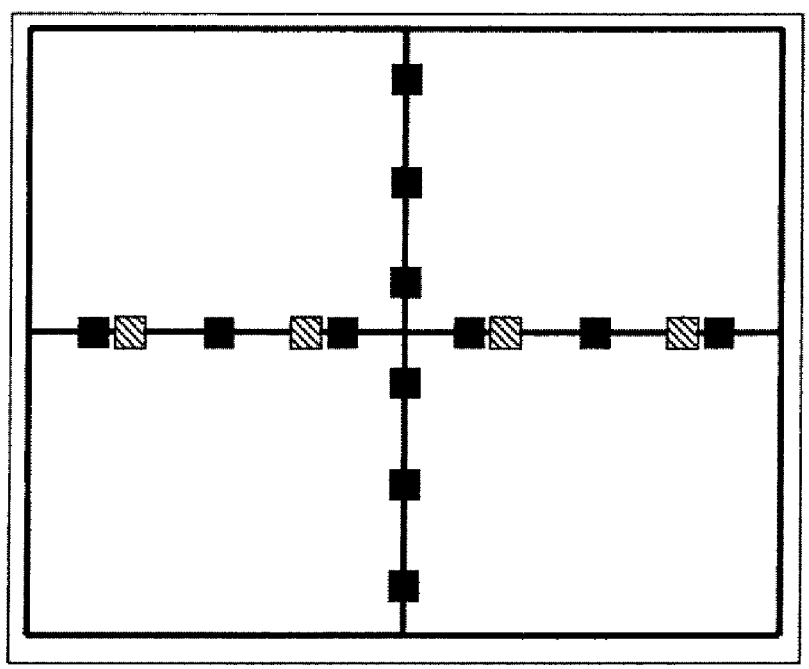
FIG. 12 describes a process of extracting parameters by using block matching (BM) and shows an example in which shrinkage in the up-down direction produced along the boundary between right and left images results in a shift in the transverse direction.

When the center of the lens distortion is shifted in the longitudinal direction, shrinkage in the right-left direction is produced along the boundary between the upper and lower images, as shown in FIG. 12. On the other hand, when shrinkage in the up-down direction is produced along the boundary between the right and left images, the center of the lens distortion is shifted in the transverse direction.

Figure 13:
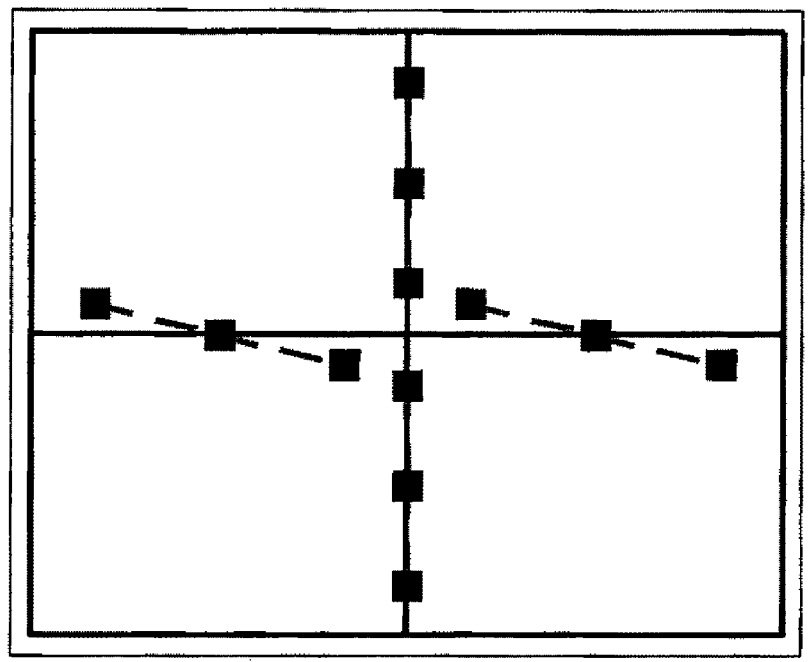
FIG. 13 describes a process of extracting parameters by using block matching (BM) and shows an example of an error due to rotation of an image.

When the degree of rotation of an image increases as the camera is oriented upward, erroneous boundaries inclined to the up-down direction are produced, as shown in FIG. 13. When the camera does not face the front but inclined to the mechanical tilt axis, the error shown in FIG. 13 is produced.

A variety of parameters are determined in such a way that the errors described above are minimized.

In this way, any four images connected to each other produce little error.

For example, fast phase correlation matching is used to carry out corresponding BM in an image. Each parameter can be quantified by obtaining vector shifts ($x_{ij}$, $y_{ij}$) and analyzing the behaviors of the shifts of the three blocks.

Figure 14A:
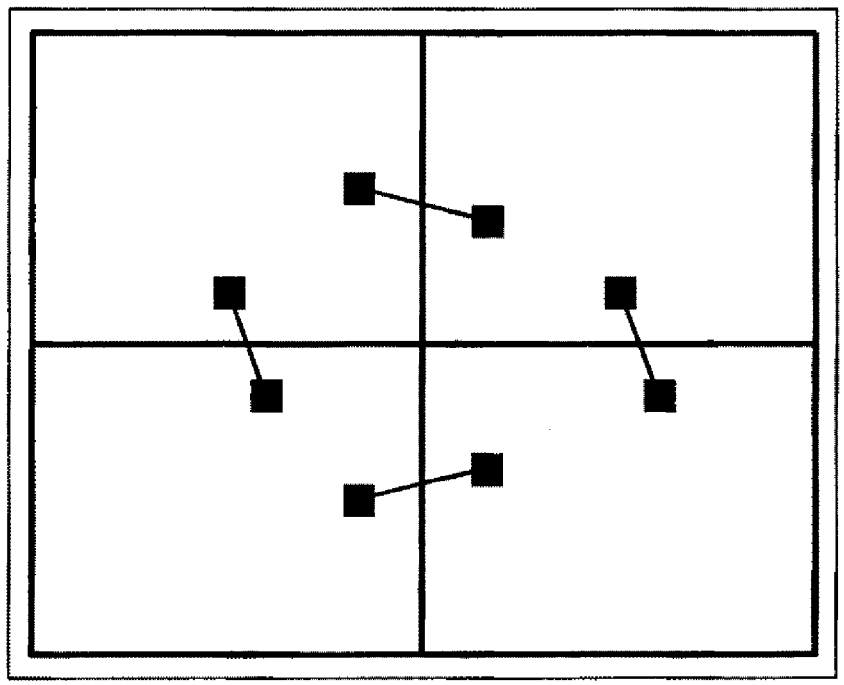
FIGS. 14A and 14B describe a procedure in which after parameters are extracted by using block matching (BM), BM is extended to a large number of images so that translation operations are carried out with minimum errors.
Figure 14B:
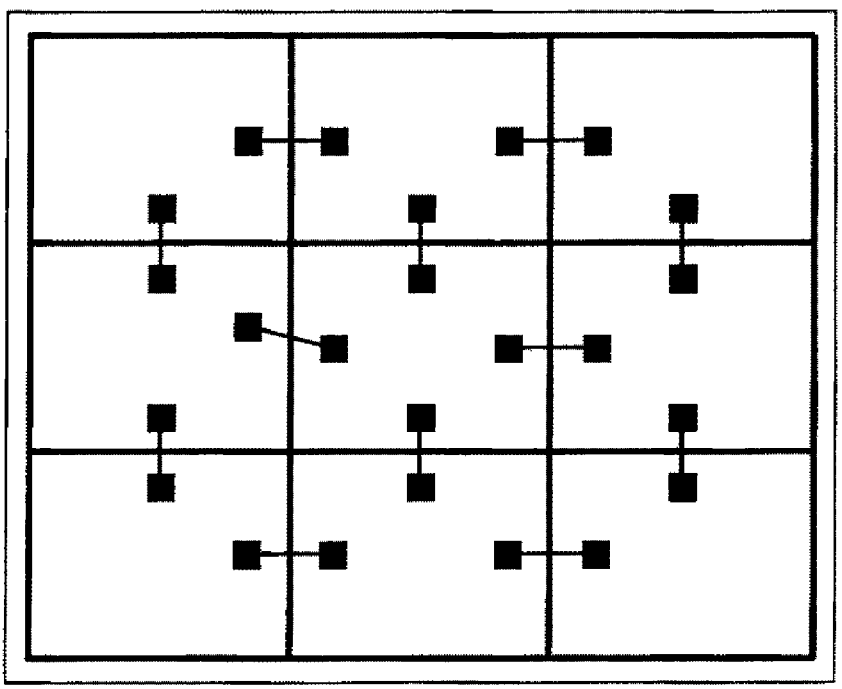

After carrying out BM (block matching) for the four images, BM is extended to many more images and the BM results for all the boundaries are evaluated simultaneously, as shown in FIGS. 14A and 14B. The optical axis direction is updated in such a way that the errors at all the boundaries decrease. The errors are thus reduced, and the multiple images are precisely combined.

In this case, a single image is set to a reference image, and the other images are translated and finally placed in the positions where the errors are minimized.

The precise combination is performed in accordance with the basic processes listed below.

Translation is used to determine optimum positions and move images thereto.

To this end, iterate the loop.

Reduce the parameter fxy indicative of the total amount of movement to be made to 0.0.

Carry out the above operation for all the images in the up-down and right-left (longitudinal and transverse) directions.

Keep the reference image unchanged.

Since the BM operations have provided the positional relationship between adjacent images, calculate the amount of movement to be made based on the positional relationship.

To calculate the amount of movement to be made, add the amounts of movement of the images immediately above and on the right of the reference image and subtracting the amounts of movement of the images immediately below and on the left of the reference image to produce an average, f[y][x].x, f[y][x].y.

Add 80% of the average to the center position of each of the current images to produce the center position of a new image.

Substitute the sum of the absolute values of the amounts of movement of all images into fxy.

Calculate how the moving operation improves the positional relationship between the upper and lower images and the positional relationship between the right and left images.

The variable fxy gradually decreases in nature as the moving operation is repeated.

In other words, fxy converges to a state in which no more movement is possible.

Terminate the processes when fxy becomes sufficiently small.

A specific example of the image combination that allows thousands of images to be seamlessly connected will be described below.

In the following description, four images are considered.

For example, as shown in FIG. 8, the lower left image is called a zeroth image IM0, and the lower right image is called a first image IM1. Similarly, the upper left image is called a second image IM2, and the upper right image is called a third image IM3.

The zeroth image IM0 stays at a fixed position. That is, the zeroth image IM0 is used as a reference image.

Let bx1[0], bx1[1], bx2[0], and bx2[1] be transverse components produced by BM (block matching).

In this description, only the transverse components are considered, although longitudinal components are separately handled.

The character bx1 represents the right-left direction, and the character bx2 represents the up-down direction. The value zero in the parentheses [ ] represents the downward or leftward direction.

When there is an image on the right of or above the reference image IM0, BM results in a positive value.

Now, as an extremely example, assume that only one location has an abnormal value and bx1[0]=10, bx1[1]=0, bx2[0]=0, and bx2 [1]=0.

Consider now a situation where a shift corresponding to 10 pixels is present in the right-left direction in the first row, and no shift is present at the other three boundaries.

Determining the position of each of the images except the reference image in tandem, that is, the result of BM performed on the zeroth image IM0 and the first image IM1 determines the position of the first image IM1; the result of BM performed on the first image IM1 and the third image IM3 determines the position of the third image IM3; and the result of BM performed on the second image IM2 and the third image IM3 determines the position of the second image IM2, disadvantageously produces a seam having a large value of 10 pixels in the positional relationship between the zeroth image IM0 and the second image IM2.

In the method of the present embodiment, the effect of the abnormal value of 10 is divided into four sub-effects of 2.5. This process is carried out by a program part of which will be described later.

Use xypos2( ) and the positional relationship between adjacent images to determine the amount of translation to be made.

The result of the first calculation shows that the first image IM1 should be moved by −5 pixels.

Use move( ) to translate the first image IM1.

The amount of actual movement is 4 pixels, which is 80% of the 5 pixels.

The amounts of movement of the images IM1, IM2, and IM3 other than the zeroth image IM0 are pox[1]=4, pox[2]=0, and pox[3]=0.

As s result of BM, bx1[0] changes from 10 to 6.

The value of bx2[1] changes from 0 to 4 accordingly.

The result of the second calculation shows that the first image IM1 should be moved by −1 pixel.

The result of the second calculation also shows that the third image IM3 should be moved by −2 pixel.

Adding 80% of the result of the second calculation produces pox[1]=4.8.

The third and the following calculating operations are carried out. In the 32th calculating operation, since fxy indicative of the sum of the amounts of movement to be made is smaller than 0.001 pixels, the calculation is terminated.

At this point, the number of pixels by which the three images are translated is 7.5, 2.5, and 5.0, and the positional relationship between the images is changed from bx1[0]=10, bx1[1]=0, bx2[0]=0, and bx2[1]=0 to bx1[0]=2.5, bx1[1]=−2.5, bx2[0]=−2.5, and bx2[1]=2.5. The above result shows that the error has been thus divided.

How many times the calculation is repeated to make fxy equal to or smaller than 0.001 and the value of resultant fxy (ii=32, fxy=0.00083) are shown below.

| n | ix | fx[n] | fy[n] |
|---|---|---|---|
| 0 | 0 | 0.000000 | 0.000000 |
| 1 | 2 | −0.000244 | 0.000000 |
| 2 | 2 | −0.000244 | 0.000000 |
| 3 | 2 | −0.000344 | 0.000000 |

| n | pox[n] | poy[n] | fz[n], the number of pixels by which each image should be translated |
|---|---|---|---|
| 0 | 0.00 | 0.00 | |
| 1 | 7.50 | 0.00 | |
| 2 | 2.50 | 0.00 | |
| 3 | 5.00 | 0.00 | |

Part of an example of the program is shown below.

```
--Part of the program (starts here)----------------
    clrpos( );   // Substitute zero into [pixel], the amount
translation to be made, pox[ ], fzx[ ], and rolla[ ].
    for (ii=0;ii<1000;ii++){
        xypos2( );   // Use the positional relationship
between adjacent images to determine the amount translation
to be made.
        if (fxy<0.001){break;}
        move( );   // Translation
    }
    fprintf(inf,"ii=1230484, fxy= 0.00000, How many times the
calculation is repeated to make fxy equal to or smaller than
0.001 and the value of resultant fxy ¥n",
    ii,fxy);
        xypos( );   // Use the positional relationship between
adjacent images to determine the amount of translation to be
made.
```

-continued

```
        move( );       // Translation
        dsppos( );     // Display the amount of correction.
        angle( );      // Convert the amount of correction into an
angle and update qq[n], pp[n].
        dsppos( );     // Display the amount of correction.
        dsperr( );     // Display the error between each pair of
sub-images that is greater than 1.
        step( );       // Create a step angle from qq[n], pp[n].
--Part of the program (ends here)----------------
```

A main subroutine is shown below.

```
--Main subroutine----------------
void xypos2( ){   // Use the positional relationship between
adjacent images to determine the amount of translation to be
made fx[n], fy[n].
// Determine the flag fz[n] indicative of an image that cannot
be translated. (Delete fprintf)
    int m,n,m2,n2,h,v,ix;
    double cx,cy;
    //fprintf(inf," n    ix    fx[n]    fy[n]¥n");
        fxy=0;
        for (v=0;v<ny;v++){     // For all images
            for (h=0;h<nx;h++){
                m=(nx-1)*v+h;   //Boundary between right
and left images
                n=nx*v+h;       // Boundary between upper and
lower images
                ix=0;
                if
((0<skip[h][v])||((v==(ny-1)/2) &&
(h==(nx-1)/2))){                 //
Keep the central image and any image whose flag has been
determined unchanged.
                    fx[n]=0;fy[n]=0;fz[n]=4;  //
fz[n] is a flag indicative of an image that cannot be
translated.
                    if (skip[h][v]==2){fz[n]=2;}  // Set
an image whose flag has been determined to 2.
                }else{
                    cx=0;cy=0;
                    if (v!=0){       // when not in the bottom
row
                        n2=n-nx;     //    immediately
below
                        if (0<fok2[n2]){
                            ix++;
                            cx-=bx2[n2];    //
Subtract the value of the image immediately below
                            cy-=by2[n2];
                        }
                    }
                    if (v!=ny-1){    // when not in the
top row
                        if (0<fok2[n]){
                            ix++;
                            cx+=bx2[n];     // Add    the
value of itself.
                            cy+=by2[n];
                        }
                    }
                    if (h!=0){       // when  not  in  the
leftmost row
                        m2=m-1;      // on the left
                        if (0<fok1[m2]){
                            ix++;
                            cx-=bx1[m2];    //
Subtract the value of the image on the left
                            cy-=by1[m2];
                        }
                    }
                    if (h!=nx-1){    // when not in the
rightmost row
                        if (0<fok1[m]){
                            ix++;
                            cx+=bx1[m];     // Add    the
value of itself.
                            cy+=by1[m];
                        }
                    }
                    if(ix==0){
                        fx[n]=0;fy[n]=0;fz[n]=1;
                    }else{
                        fx[n]=cx/ix;
                        fy[n]=cy/ix;
                        fz[n]=0;
                    }
                    fxy+=fabs(fx[n])+fabs(fy[n]);
                }
            }
        }
    }
//*******************************************
void move( ){       Translation
    int m,n,h,v;
    for (v=0;v<ny;v++){        // the center position of an
image (pixel)
        for (h=0;h<nx;h++){
            n=nx*v+h;
            if (fz[n]==0){          // when not isolated from
the surroundings
                pox[n]+=-fx[n]*0.8;
                poy[n]+=-fy[n]*0.8;
            }
        }
    }
    for (v=0;v<ny;v++){     //  positional  relationship
between right and left images
        for (h=0;h<nx-1;h++){
            m=nx*v+h;
            n=(nx-1)*v+h;
            bx1[n]+=-(fx[m]-fx[m+1])*0.8;
            by1[n]+=-(fy[m]-fy[m+1])*0.8;
        }
    }
    for (v=0;v<ny-1;v++){   //  positional  relationship
between upper and lower images
        for (h=0;h<nx;h++){
            n=nx*v+h;
            bx2[n]+=-(fx[n]-fx[n+nx])*0.8;
            by2[n]+=-(fy[n]-fy[n+nx])*0.8;
        }
    }
}
//*******************************************
```

As described above, according to the first configuration of the present embodiment, a digital camera in which a CMOS image sensor is incorporated can be used to capture images at a high frame rate without degradation in resolution and reduce the effect of parallax, the effect of reduction in the amount of light at the periphery, and the effect of lens distortion. Further, a high-quality panoramic image can be created.

The image combination can be accurately carried out irrespective of the number of images to be combined, and unevenness in color can also be eliminated.

Since the lens distortion correction coefficient can be extracted from actually captured images, cumbersome calibration is no longer necessary and the precision is significantly improved.

The method for seamlessly connecting thousands of images allows images within a necessary range to be captured at necessary resolution without worrying about the number of images to be captured.

The second configuration will next be described.
[Second Configuration]

A description will be made of recording spatial positions of successively captured images.
<Outline>

Panoramic imaging using successive photographs is a task of dividing a space and reassembling the divided spaces into a single photograph. A highly precise panoramic photograph can be created from the photographs by using spatial information obtained during the imaging process to perform an inverse operation.

In the present embodiment, when each photograph is captured, information on the imaged space is calculated from the sensors and the image, and the information is attached to the photograph. This procedure helps create a panoramic photograph.

<Attaching Information on Imaged Space>

For example, when panoramic imaging is performed, a lens fixed at a single point is driven by a motor so that the imaging direction is changed.

Photographs captured under the above condition only differs from one another in terms of imaging direction but are obtained by the camera apparatus 10 located in a fixed position. That is, the focus position is fixed. Therefore, the following description is limited to images captured around a certain point within a fixed angle of view.

When the imaging method described above is used, the following two types of information on the captured space are obtained: That is, information on the target having been imaged (view vector) and information on the angle of rotation (roll) around the view vector.

<Definition of Projection Sphere and Space>

Photographs obtained by imaging a space are projected on a single surface.

Consider that a space is imaged in panoramic photography. To support all directions, assume that a sphere is present around a photographing user and the captured images are projected on the sphere. Image processing is then readily carried out. When the sphere is used to define the view vector, the coordinate space is also determined.

The following definitions are made: The focus position where the camera apparatus 100 is present is the origin (0, 0, 0), and the projection sphere has a radius of 1.

Assuming that the horizontal front side is positioned at the point of 1 on the Z axis, f(0, 0, 1), the view vector is a vector having a start point (0, 0, 0) and an end point f(0, 0, 1).

The view vector is a unit vector having a length of 1, and the length of the view vector is 1 in every direction.

Since a view vector v1 alone is insufficient to record the roll of a frame, a roll vector v2 is additionally recorded. The roll vector v2 is information indicating the upward direction of an image in question, and the vector (v2-v1) indicates the upward direction of the image.

In this way, the direction in which an image is captured can be expressed by the two vectors (two points on the projection sphere), and the imaging directions can be described at a uniform density over the projection sphere.

<Relative Movement and Absolute Coordinate>

The spatial information obtained when an image is captured includes two types of information, relative information and absolute information.

Creating a panoramic image may only require absolute positional information indicating the orientation in which each image is captured, but reliable absolute information may not be obtained. To address the problem, relative information is accumulated to obtain absolute information, or rough absolute information is used to obtain corrected absolute information.

In a lens-driven panoramic camera, absolute information is used as a scenario to move the lens. However, since shaking during the imaging process, errors when the lens is driven, rough precision of the attitude sensor, and other factors are added as relative information, a precise absolute value is determined by computation.

<Expanding Relative Movement to Space>

Assume now that the image recognition and the attitude sensor have provided accurate relative information.

When the current image frame f1 is translated from the preceding image frame f2 by (dx, dy) and rolled by the amount of frame roll rz, the calculation based on the angle of view shows that the amounts of rotation around the x and y axes are rx and ry, respectively. In this case, the view vector v2 for f2 is rotated by (rx, ry, rz) to form the view vector v1 for f1.

The absolute position on the projection sphere is determined based on the above information. However, rotating v2 by (rx, ry, rz) from the position of v2 may require relatively complex computation.

To address the problem, the latest image f1 is fixed to the exact front side v1 (0, 0, 1), and the image f2 and the following images arranged on the projection sphere are, as a whole, rotated by (−rx, −ry, −rz). That is, the latest image f1 is used as a reference, and the others are moved relative to the reference.

Repeating this operation causes the position of the last image to be (0, 0, 1) but allows the absolute positions of the other images to be determined.

The reason why the two vectors, the view vector and the roll vector, are produced by also expressing the roll information in the form of vector is that the relative rotation (rotation of the sphere instead of the view vector) is readily carried out.

<Accumulation of Relative Movement Values and Discrepancy from Absolute Information>

In the above description, only the relative information is used to spatially arrange the images, but in practice, information on absolute roll and inclination in the up-down direction are also obtained, for example, from the attitude sensor 14. However, the absolute information obtained from the attitude sensor 14 is not precise enough to produce a panoramic photograph, and the information from the attitude sensor 14 may not be used as it is.

On the other hand, the relative information is highly precise because it is obtained from image recognition, but it still contains errors. Connecting images based on the relative information results in a large discrepancy resulting from accumulated small errors.

To address the problem, absolute information from the attitude sensor 14 is used to check whether or not any accumulated error has been produced.

In the course of expanding the relative movement to a space, the relative movement is compared, at certain intervals, with the corresponding absolute value from the attitude sensor. When the discrepancy of the relative movement from the absolute value obtained from the attitude sensor becomes too large, the absolute value from the attitude sensor is used to correct the relative movement. The relative movement accumulation is resumed from this position.

FIG. 15 is a functional block diagram showing a spatial arrangement method based on successively captured images and the sensor information.

In FIG. 15, a functional block 41 sets a zero reference with respect to the detection signal from the angular speed sensor 142, and a movement integrator 42 performs integration to provide the amount of movement.

A detector 43 compares adjacent frame images captured by the imaging device 12 and detects the amount of movement.

The outputs from the movement integrator 42 and the detector 43 are used to perform coordinated correction in a coordinated correction logic 44, and a relative position integrator 45 integrates the relative position to provide absolute position information.

An absolute position corrector 46 then corrects the absolute position information based on the detection result from the acceleration sensor 141, and an arrangement section 47 determines the spatial positions of the frames and arranges them accordingly.

<Spatial Coordinate Information and Panoramic Photograph>

The calculation described above is carried out while images are captured at the same time, and the images along with spatial coordinate information indicating the imaging direction are simultaneously recorded as meta-data.

The meta-data alone allow a panoramic photograph to be created. The meta-data can also be used as basic data when more precise adjustment and authoring are carried out in post-processing.

Since meta-data indicative of the imaging direction in a space are not present in related art, no precise panoramic photograph can be created. In contrast, the present embodiment solves the problem by providing coordinate information when images are captured.

As described above, in the second configuration, successive images are spatially arranged by using frame movement information obtained by the image recognition technique and movement information from the attitude sensor. The information from the attitude sensor supplements the information that is not provided by the image recognition. The information from the attitude sensor is used to check whether the image recognition has been successfully carried out or is used as auxiliary coordinates when the image recognition has failed. The spatially arranged images create a single complete panoramic image.

Using the method described above allows not only the scene and its vicinity in front of the user but also the scene immediately above and behind the user to be expressed correctly, whereby omnidirectional imaging or whole sky imaging can be supported.

A panoramic image can be created without errors not only when only the scene including its vicinity in front of the user is imaged but also when a wide-angle scene is imaged.

The method described above is, of course, applicable to a case where a high-definition image is captured by the camera held by hands.

The third configuration will next be described.

[Third Configuration]

A description will be made of correction of position recognition using successively captured images.

<Outline>

To attach precise imaging position information to each of the successively captured images, the present configuration employs an approach using the attitude sensor in combination with image recognition, what is called "dynamic calibration."

<Successive Imaging and Information on Imaging Position>

When successively captured photographs are combined into a panoramic photograph, the pictures sometimes contain no high-frequency components and hence continuity may not be identified from the pictures.

In the situation described above, information indicating the distance between successive frames may not be obtained. In this case, an entire panoramic photograph may not be created.

To provide positional information even in the situation described above, not only photographs but also movement information and positional information are recorded at the same time during imaging operation by using the attitude sensor 14.

<Using Attitude Sensor>

The attitude sensor 14 is formed of the three-axis angular speed sensor 142 and the three-axis acceleration sensor 141, which are used simultaneously and in parallel.

The angular speed sensor 142 recognizes how fast the camera is currently being rotated, and the acceleration sensor 141 senses the inclination in the horizontal direction.

Movement information is obtained, whenever possible, from the captured photographs, but when the conditions of the pictures do not allow image recognition, the amount of movement from the preceding image is obtained from the attitude sensor 14.

More exact positional information can be obtained by comparing the amount of change in the detection result from the attitude sensor 14 as a whole with the amount of movement obtained by the image recognition and allowing both the amounts to influence each other.

<Problems of Attitude Sensor>

In the intended panoramic photography, the precision of an image is higher than the precision of the attitude sensor 14. When positional information is produced only from the information obtained from the attitude sensor 14, the resultant panoramic photograph could be too rough to look at.

One should not rely on the precision of the attitude sensor 14, but should use it as an assist when no information is obtained at all.

Like typical sensors based on physics, the output from an attitude sensor is not stable but typically fluctuates.

Further, since the zero position of the attitude sensor in the stationary state varies with the conditions thereof, it is necessary to create the stationary state before imaging is initiated and to measure the value of the zero position. Once the value of the zero position has been measured, the amount of movement is measured based on the shift from the zero position.

<Image Recognition and Correction of the Same>

In the present configuration, successive images are captured in panoramic photography and information from the attitude sensor is recorded at the same time as meta-data.

This method is problematic in that the meta-data information is not readily used when the images are combined into a panoramic image later, because the fluctuation of the output from the attitude sensor 14 is too large.

To address the problem, the meta-data produced by image recognition are corrected during the imaging process and then recorded.

In the process of recording the meta-data, the spatial information indicating which direction the camera is currently oriented in is updated and then held internally. A variety of factors, however, degrades the precision of the spatial information.

To address the problem, in the present embodiment, dynamic calibration is carried out in which image recognition and the attitude sensor are used to correct and update the internally held spatial information in a real-time manner.

When successive images are captured in panoramic photography, there is a predetermined movement scenario when the camera is driven by a motor, or there is no movement scenario when the camera is manually swept.

When there is a movement scenario when the camera is driven by a motor, approximate imaging positions are known in advance, but unexpected shaking and motion during the imaging operation may not be taken into account. The attitude sensor 14 is used to detect such changes during the imaging operation.

When the attitude sensor 14 senses any change during the imaging operation, image recognition is used to precisely examine how much the actual movement deviates from the expected movement scenario. Using the amount of movement obtained from the attitude sensor 14 as a reference in the precise examination described above allows the image recognition to be readily carried out.

After the deviation from the expected movement scenario is thus calculated, the deviation is added to the values of the movement scenario, and the information on the position where the imaging is actually carried out is recorded as metadata of the captured photograph.

Since there is no movement scenario when the camera is manually swept, image recognition-based comparison between the current frame and the preceding frame is used to calculate the amount of movement whenever a frame is captured.

In this operation, although how much the frame is moved is difficult to determine, the amount of movement can be precisely calculated by providing an approximate amount of movement from the information from the attitude sensor 14 and carrying out image recognition based on the approximate value.

When it is difficult to carry out the image recognition, the amount of movement obtained from the attitude sensor is temporarily recorded and the coordinates of the current frame are determined later, for example, by referring to the positional relationship between the preceding frame and the current frame and the positional relationship between the current frame and the following frame.

Figure 16:
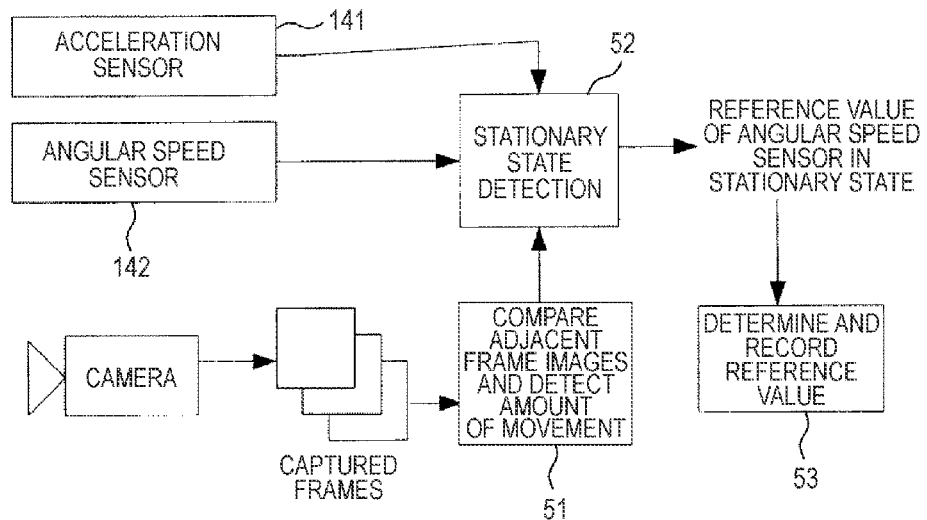
FIG. 16 is a functional block diagram showing correction of the sensor zero position in the stationary state in a method for making sensor information more precise by relating successively captured images to the sensor information.

FIG. 16 is a functional block diagram showing correction of the sensor zero position in the stationary state in a method for making sensor information more precise by relating successively captured images to the sensor information.

In FIG. 16, a detector 51 compares adjacent frame images captured by the imaging device 12 and detects the amount of movement.

A stationary state detector 52 detects the stationary state based on the detection signal from the angular speed sensor 142, the detection signal from the acceleration sensor 141, and the detection signal from the detector 51, and provides a reference value of the angular speed sensor in the stationary state.

Thereafter, a recorder 53 determines the reference value and records the reference value in the memory 17.

Figure 17:
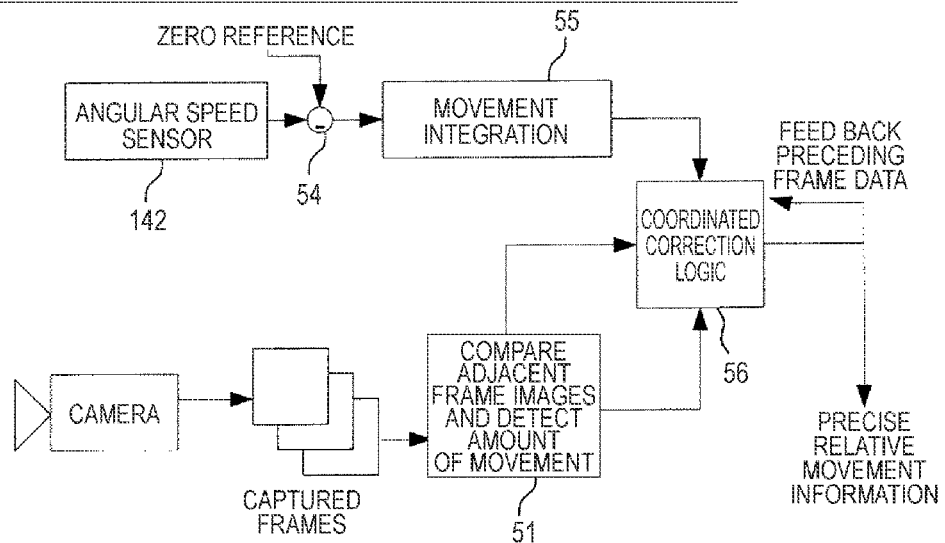
FIG. 17 is a functional block diagram showing how to coordinate movement information to make it more precise in a method for making sensor information more precise by relating successively captured images to the sensor information.

FIG. 17 is a functional block diagram showing how to coordinate movement information to make it more precise in a method for making sensor information more precise by relating successively captured images to the sensor information.

In FIG. 17, a functional block 54 sets a zero reference with respect to the detection signal from the angular speed sensor 142, and a movement integrator 55 performs integration to provide the amount of movement.

The detector 51 compares adjacent frame images captured by the imaging device 12 and detects the amount of movement.

The outputs from the movement integrator 55 and the detector 51 are used to perform coordinated correction in a coordinated correction logic 56, which provides precise relative movement information.

As described above, in the third configuration, when successive images are recorded, the frame movement information obtained by the image recognition technique is related to the movement information from the attitude sensor to calculate the angle of view per image pixel, the value from the attitude sensor in the stationary state, the relationship between the value from the attitude sensor and the angle of view per pixel, and other information that may not be obtained from only one of the two types of information described above.

Therefore, the image-based recognition method and the attitude sensor-based detection method, each of which alone does not provide satisfactory precision, are coordinated in the present technique, whereby the precision and stability can be significantly improved.

The above second and third configurations will be described in more detail with reference to FIGS. 18 to 21.
<Captured Photographs and Rotation of Photographing User>

When images are captured in panoramic photography, variation in the position from which images are captured results in discontinuity due to parallax.

The discontinuity due to parallax may not be corrected by image processing performed after the images have been captured.

Therefore, to capture images in panoramic photography, the photographing user and the camera should stay in a specific position, and photographs should be captured by rotating the camera around the specific position in such a way that the focus point of the camera is fixed.

It is noted that the distance over which the eyes looking at two different captured photographs move is proportional to the amount of rotation during the imaging operation.

When each of the photographs is a digital image and the size thereof can be expressed by the number of pixels, the amount of movement between two images that is expressed by the number of pixels can be conversely determined by calculating the rotary movement distance during the imaging operation. A necessary parameter in this operation is the angle of view.

The angle of view is a value indicative of the width shown in a single photograph in the right-left direction or the up-down direction, the width expressed in the form of the angle of the imaged space.

The angle of view is a parameter measured and provided before the imaging operation, and it is assumed that the angle of view remains unchanged during the imaging operation.

When the horizontal angle of view is 30 degrees and the number of pixels in the transverse direction of a captured digital photograph is 1000 pixels, the angle of the imaged space per pixel is 0.03 degrees. That is, when the movement between two photographs is found to be 800 pixels, the actual imaging is carried out by rotating the camera by 24 degrees.

The angle of view per pixel is used as the most important initial value.

> The angle of view per pixel=the angle of view of a frame/the number of pixels in the frame > The amount of rotation between two captured photographs=the amount of movement between the two photographs that is expressed by the number of pixels×the angle of view per pixel The actual angle of view per pixel is measured and held in advance as an initial value.
<Angular Speed Sensor and Amount of Rotation>

An angular speed sensor outputs the current angular speed.

Since the output value changes with time, the change in angular speed can be found, but the output value does not directly represent the amount of rotation. To obtain the angle of rotation from the angular speed sensor, it is necessary to define the unit of an integral.

The angular speed sensor is used to carry out measurements at fixed intervals, and the measurement intervals are fixed as an important parameter.

It is necessary to not only integrate any of the measured angular speeds with respect to time but also externally measure the amount of actual rotation during the integration period. The integrated angular speed is divided by the amount of actual rotation to determine the integral of the angular speed per degree.

Thereafter, the amount of rotation can be proportionally determined by dividing the integral of an angular speed by the integral of the angular speed per degree.

The actual integral of the angular speed per degree is measured and held in advance as an initial value.

<Dynamic Calibration>

The output from an angular speed sensor is a relative angular speed, and the output varies as the environment changes unless an excellent angular speed sensor is used. Since the variation affects actual measurements, every measurement may require correction.

The dynamic calibration used herein is a process that is specific to panoramic imaging and automatically performs the correction by using feedback from images captured in panoramic photography.

Among the parameters of an angular speed sensor, two parameters, the zero point position in the stationary state and the integral of the angular speed per degree, vary as the environment changes. In addition to the two parameters, there is an accumulated integration error due to the relative movement. The three parameters described above are corrected.

<Correction of Zero Point of Angular Speed Sensor>

Figure 18:
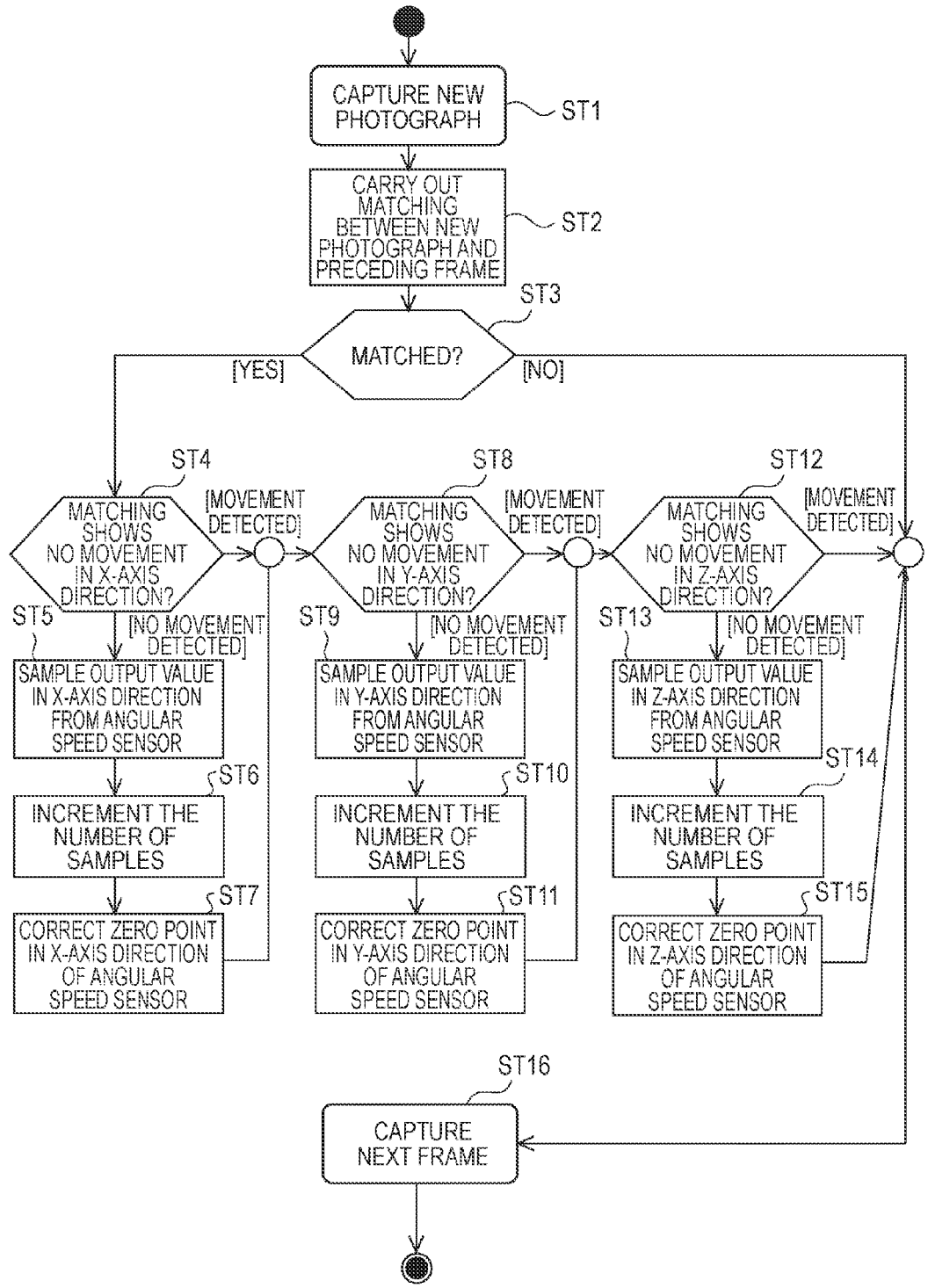
FIG. 18 is a flowchart of a procedure of correcting the zero point of an angular speed sensor.

FIG. 18 is a flowchart of a procedure of correcting the zero point of the angular speed sensor.

To correct the zero point of the angular speed sensor 142, the processes in the steps ST1 to ST16 in FIG. 18 are carried out.

No angular speed can be detected unless the output value from the angular speed sensor 142 in the stationary state is accurately known. However, the zero point in the stationary state disadvantageously changes with temperature and other environmental factors in some cases.

An accurate zero point during the imaging operation is determined by using the result of image matching to correct the drift of the zero point.

A preset initial value is used as the zero point output value from the angular speed sensor 142 when it is activated.

Image matching between two frames is carried out (ST1 to ST3). When the result of the matching is reliable because high-frequency components are contained and shows no movement in the directions along the X, Y, and Z axes, the output values in the directions along the X, Y, and Z axes from the angular speed sensor are considered to indicate zero points, and then the output values are sampled.

The values sampled as the zero points in this process are used for correction (ST4 to ST15).

When any movement is detected in any of the axial directions, the output value is not a zero point. In this case, no sampling is carried out, and no zero point correction is made.

After the sampling operation, the number of samples is incremented and the zero point value is corrected.

The correction involves dividing the difference between the current zero point value and the sampled value by the number of samples, and adding the result to the current zero point value. The average of the zero point is thus calculated.

Corrected zero point value=zero point value+(sampled value−zero point value)/the number of samples <Correction of the Amount of Movement Obtained from Angular Speed Sensor>

Figure 19:
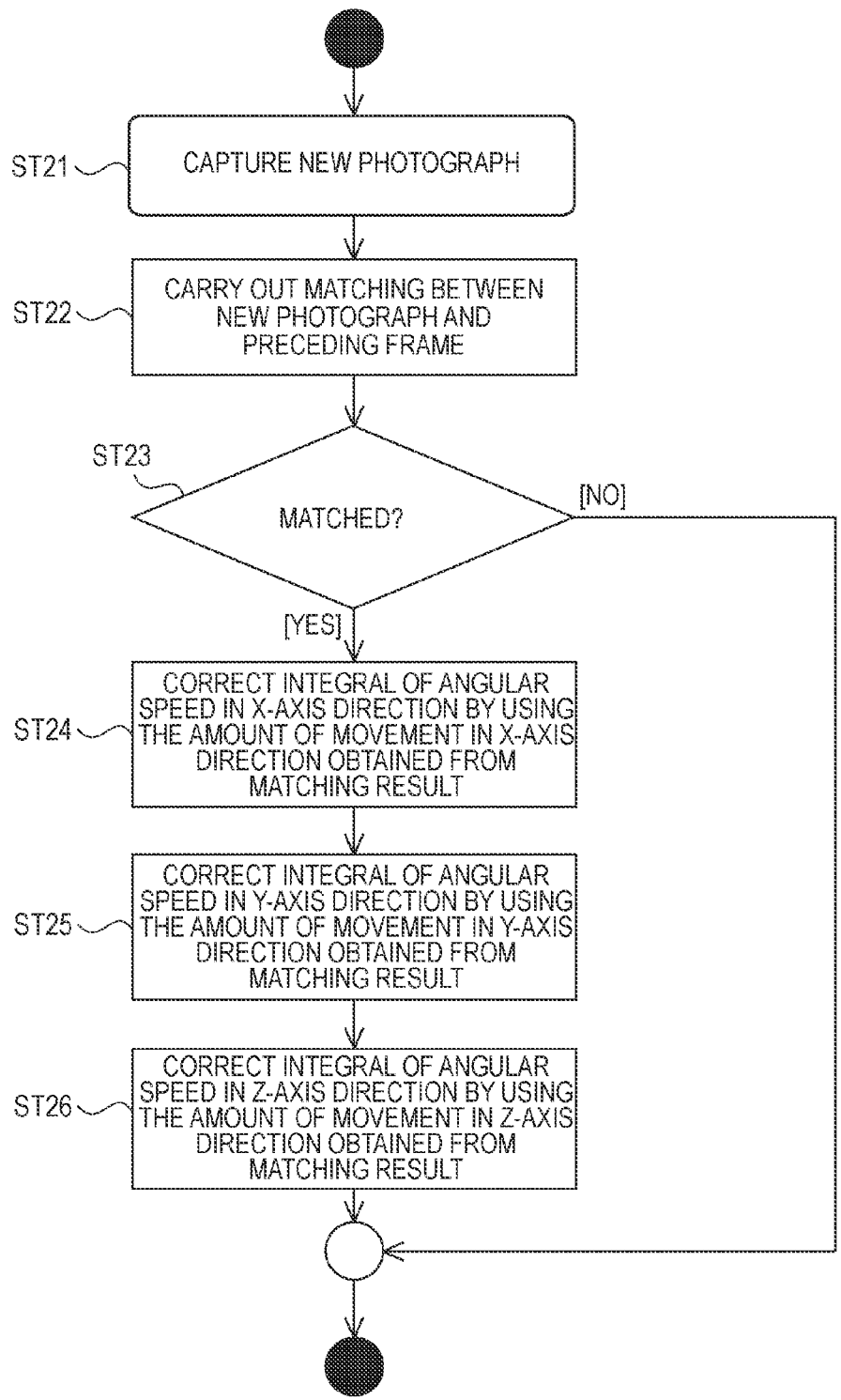
FIG. 19 is a flowchart of a procedure of correcting the amount of movement obtained from the angular speed sensor.

FIG. 19 is a flowchart of a procedure of correcting the amount of movement obtained from the angular speed sensor.

To correct the amount of movement obtained from the angular speed sensor, the processes in the steps ST21 to ST26 in FIG. 19 are carried out.

The integral of the angular speed per degree, which is a parameter used to determine the angle of rotation from the integral of an angular speed obtained from the angular speed sensor, disadvantageously changes with temperature and other environmental factors in some cases.

Image matching is carried out (ST21 to ST23), and the integral of the angular speed per degree is corrected and updated based on the result of the matching (ST24 to ST26). In this way, an accurate value of the integral of the angular speed per degree during the imaging operation is determined.

Image matching between two frames is carried out. When the result of the matching is reliable because high-frequency components are contained, the amount of movement in each of the directions along the X, Y, and Z axes obtained by the image matching and the corresponding integral of the angular speed are used to determine the integral of the angular speed per degree.

Integral of angular speed per degree=integral of angular speed/(angle of view per pixel×the amount of movement in terms of pixel along X axis)

Corrected integral of angular speed per degree=integral of angular speed per degree+(sample value−integral of angular speed per degree)/the number of samples <Acceleration Sensor Used to Assist Angular Speed Sensor>

The angular speed sensor outputs the amount of relative angular movement.

Absolute positional information indicating the current position is calculated by integrating the relative value with respect to time, up to the time corresponding to the current position.

When the relative value contains a small amount of shift or noise, the resultant shift may possibly increases as the integration time increases.

The acceleration sensor can detect the acceleration of gravity to provide the absolute values of rotation around the Y-axis direction (tilt) and rotation around the Z-axis direction (roll), but only in a unit that is too large to be used in panoramic imaging. The acceleration sensor is therefore less useful than the angular speed sensor in panoramic imaging.

However, the acceleration sensor having an advantage of providing an absolute value can be used to compare its output value on a regular basis with the integral of a relative movement distance obtained from the angular speed sensor and correct the integral and the absolute value.

At the timing when the amount of absolute movement becomes large enough to be detected by the acceleration sensor, the absolute position detected by the acceleration sensor is compared with the absolute position derived from the integral of the relative movement distance obtained from the angular speed sensor, which is then corrected as necessary.

<Movement Determined from Images and Movement Determined from Sensor>

Figure 20:
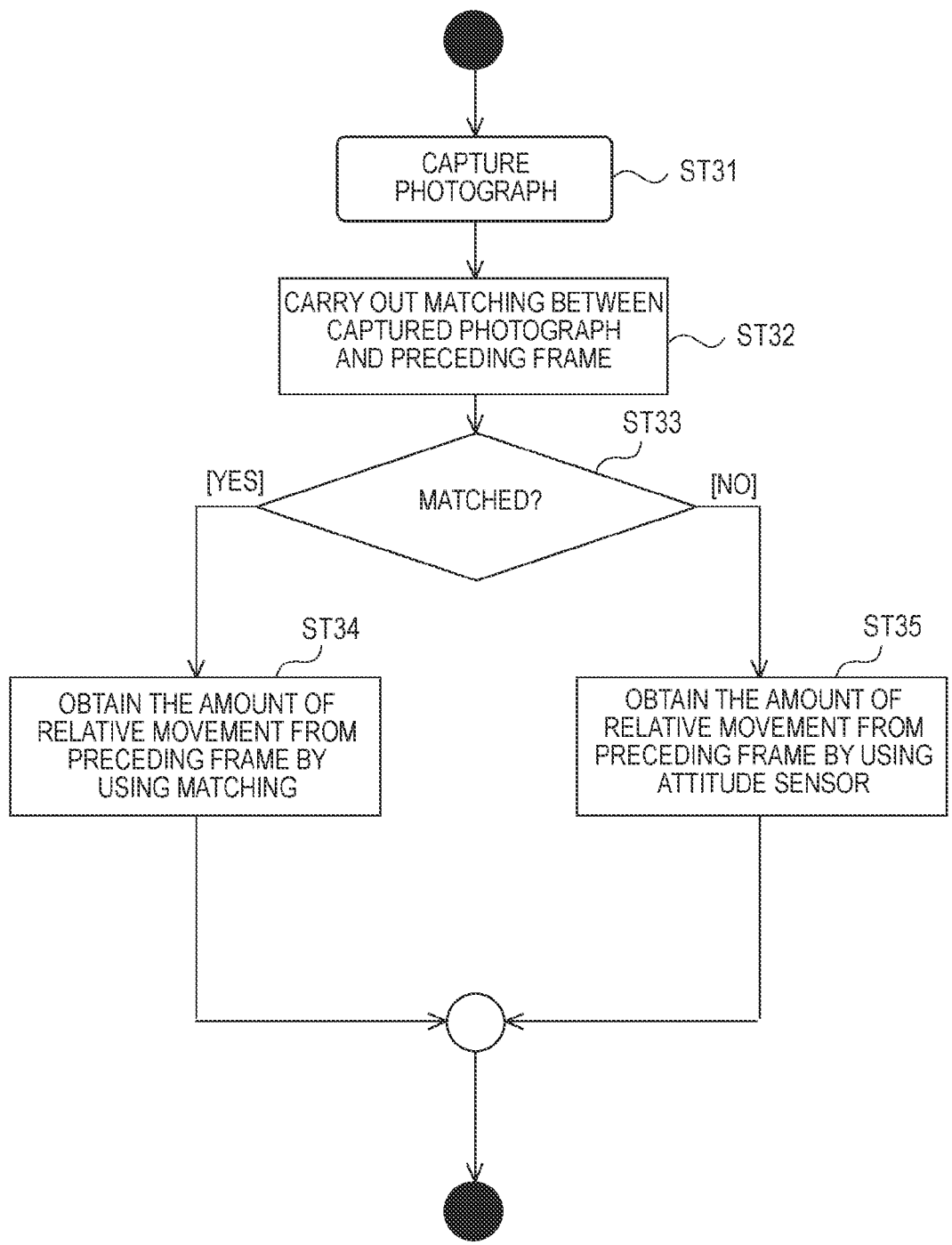
FIG. 20 is a flowchart of a method for acquiring the amount of movement.

FIG. 20 is a flowchart of a method for acquiring the amount of movement.

In the method for acquiring the amount of movement, the processes in the steps ST31 to ST35 in FIG. 20 are carried out.

The resolution of the amount of movement obtained by the image matching is much higher than the resolution of the angular speed sensor 142. Therefore, the relative movement distance is calculated by the image matching whenever possible (ST33 and ST34).

Images that do not contain high-frequency components, such as a sky having a single color thereacross, will not give any matching. In this case, the output from the angular speed sensor 142 is used to calculate the amount of relative movement (ST33 and ST35).

<Method for Assigning Spatial Coordinates by Using Captured Photographs>

FIG. 21 is a flowchart of a method for assigning spatial coordinates by using captured photographs.

In the method for assigning spatial coordinates by using captured photographs, the processes in the steps ST41 to ST47 in FIG. 21 are carried out.

The amount of relative rotation from the preceding frame can be determined by the image matching and the angular speed sensor for all the photographs captured in panoramic photography as described above (ST41 to ST43).

To create a panoramic photograph, it is necessary to assign absolute spatial coordinates by using the amounts of relative rotation.

Since the captured photographs have the same angle of view, the assignment can be made by considering only the center of each of the captured spaces, that is, the vector along which the camera is oriented.

The amount of relative rotation from the preceding frame can also be expressed in the form of the angle between the direction in which the camera is oriented, that is, the imaging view vector, and the vector for the preceding frame.

When the arrangement is carried out in a simplified method in which only the view vector is used, the rotation of a frame around the Z-axis direction or the roll may not be considered.

To address the problem, another vector shifted along the Y axis, immediately above a frame, is prepared to express the roll of the frame.

The two vectors express the direction in which the camera captures an image and the roll around the Z axis, and frame information is maintained even when the frame is rotated.

When positioned in a space, a new frame is typically positioned in the front position in the space "a" (0, 0, 1.0).

When any amount of relative rotation is present, all the previous frames are rotated by that amount in the opposite direction, and then the new frame is positioned in the front position in the space "a" (0, 0, 1.0) (ST44 to ST46).

Instead of the movement from the preceding frame, the amount of movement between the current frame and the past frames is used as a reference.

Now, let a frame A be the current captured frame and a frame B be the preceding captured frame.

How much the frame B is rotated relative to the frame A is calculated (ST43).

When the calculation shows that the position of the camera for the frame B is the position of the camera for the current frame A rotated by rx around the X-axis direction, ry around the Y-axis direction, and rz around the Z-axis direction, all imaging direction vectors and roll index vectors for the frames having been captured in the past except the frame A are rotated by rx, ry, and rz.

The rotation matrix may be a typical one used in a three-dimensional space.

The rotation around the X-axis direction:

$$x2=x\times\cos(rx)-y\times\sin(rx)$$

$$y2=y\times\sin(rx)+z\times\cos(rx)$$

$$z2=z$$

The rotation around the Y-axis direction:

$$x2=x\times\cos(ry)-z\times\sin(ry)$$

$$y2=y$$

$$z2=x\times\sin(ry)+z\times\cos(ry)$$

The rotation around the Z-axis direction:

$$x2=x$$

$$y2=y\times\cos(rz)-z\times\sin(rz)$$

$$z2=y\times\sin(rz)+z\times\cos(rz)$$

Rotating the entire frames and positioning a new frame in place, which is the front side, as described above allows transfer from the amount of relative rotation to the absolute spatial coordinates.

When all the transfer operations are eventually completed, all the frames can have respective appropriate absolute coordinates.

However, since the last frame is used as the reference, all the frames may need to be moved relative to an arbitrary frame in some cases.

The fourth configuration will next be described.

[Fourth Configuration]

In the fourth configuration, when any effect of parallax or a moving object is detected, the display device 18 or the sound producer 20 issues a warning to prompt the user to recapture images.

Further, in the fourth configuration, the moving object is detected in such a way that the overlapping rate is set at 50% or higher so that any part of the subject appears in at least two adjacent images. As a result, any effect of parallax or a moving subject is detected based on the similarity among motion vectors between the adjacent images.

The camera apparatus 10, which is rapidly swung to capture multiple strip-shaped images of a subject within a wide range and combines them into a single image, detects how much the parallax affects a near subject and prompts the user to recapture images around the viewpoint of the camera, from which the camera views a subject.

In general, the viewpoint of a wide-angle camera is located immediately behind its lens, and the camera is ideally held by hands and rotated around the wrist of the user.

The images thus captured by rotating the camera around its viewpoint can be correctly combined even when a near subject is contained.

The camera apparatus 10 of the present embodiment is also advantageous in that capturing images around a position slightly shifted from the viewpoint of the camera unlikely affects the captured images, because any of the captured multiple images has a strip shape.

However, when images are captured by holding the camera by hands and rotating it around the shoulder of the user, parallax greatly affects the captured images because the camera is rotated around a position fairly behind the viewpoint of the camera.

In this case, there will be virtually no problem when only remote scenery is imaged, but images may not be combined correctly when the captured images contain a near subject, because the positional relationship of the near subject between adjacent images differs from that of a remote subject.

To address the problem, in the fourth configuration, when it is found that the effect of parallax does not allow correct image combination, an instruction of rotating the camera around its viewpoint is issued to prompt the user to recapture images.

[Method for Detecting Parallax]

A method for detecting parallax will be described.

Multiple block matching (BM) operations are carried out in the area where two temporally adjacent images overlap with each other to determine the motion vectors for the two images.

In general, the BM operations result in substantially the same vectors when the sweep operation has been correctly carried out.

When the camera is rotated around the shoulder, and a near subject overlaps with remote scenery, the BM operations result in different vectors.

Since the image changes greatly at the boundary between the near subject and the remote subject, the BM operations will not provide correct values. This fact is used to detect parallax.

A specific example of parallax detection will be shown below.

The following processes are carried out by the image signal processor 161 and the microcomputer 162 in the system controller 16 in a coordinated manner.

<Method for Detecting Parallax>
[Rough Combination]

The camera apparatus 10 is rotated from left to right within a range of approximately 120 degrees so that several tens of images are captured.

Adjacent images share a sufficiently large area where the same subject is shown (overlapping area).

The motion of the camera apparatus 10 during the imaging operation is detected by the attitude sensor 14 and recorded at short temporal intervals.

Since the data are recorded in synchronization with the captured images, it is possible to find which direction the camera is oriented in when each of the images is captured, although the precision of the direction is not so high.

The images are arranged on a longitude-latitude plane based on the thus obtained information.

In this state, the overlapping area between any pair of adjacent images, having a large size of approximately 100 pixels, is placed in a substantially correct position.

A precise automatic combination routine will start from this state.

[Precise Automatic Combination]

Motion detection (ME: Motion Estimation) is carried out at multiple locations in each of the overlapping areas.

ME or motion detection employs FET-based phase only correlation. Feature extraction and other suitable methods are also applicable.

Only one ME operation is necessary when only translation Occurs.

Two ME operations provide inclination.

Three ME operations provide lens distortion coefficient.

When no moving object is present in each of the overlapping areas and remote scenery is imaged by the camera, in which the camera held by hands does not affect the captured images, the number of ME operations may be small.

However, when a moving object is present and/or a near object that produces the effect of parallax is imaged, a small number of ME operations will not allow what is happening to be found.

Therefore, a largest possible number of ME operations are carried out in each of the overlapping areas.

When a large number of ME operations results in motion vectors having substantially the same value, one of the adjacent images can be translated and aligned with the other.

Even when the resultant motion vectors do not have substantially the same value, but the value of the top motion vector changes to the value of the bottom motion vector at the same rate, one of the adjacent images can be inclined and aligned with the other.

However, when the ME operations in any of the overlapping areas result in different values, combination may not be carried out.

The reason for this is that the images have been captured with the viewpoint moved in a situation where a moving subject is present or a near subject and a remote subject are present together.

[Method for Carrying Out ME]

Rough ME operations are first carried out on shrunk images.

The shrinkage rate is gradually reduced, and ME operations are eventually carried out on full-size images.

More detailed motion vectors can be acquired by changing the block size used in an ME operation and/or reducing the distance between the centers of adjacent blocks.

[Evaluation of ME Results]

A large number of ME results are used to judge whether or not correct stitching can be carried out. When stitching may be not carried out correctly, the user is notified so and prompted to recapture images.

The stitching is carried out whenever possible, and the combination result is displayed and recorded in a recording medium (memory).

[Behavior of Moving Subject]

The behavior of a moving subject will next be described.

Multiple block matching (BM) operations are carried out in the area where two temporally adjacent images overlap with each other to determine the motion vectors for the two images.

The resultant vectors reflect the direction in which the moving portion moves, whereby the moving portion can be separated from the stationary portion.

Since the image changes greatly at the boundary between a moving object and a stationary subject, the BM operations will not provide correct values. When the sweep operation is carried out in the transverse direction, it is not possible to distinguish between parallax due to a near stationary subject and a subject moving in the transverse direction.

To address the problem, a warning is issued without distinguishing between parallax and a moving subject.

When the warning is detected, any of the current techniques may not carryout stitching without any strangeness.

Therefore, in the present embodiment, a warning is issued to prompt the user to "simply recapture images" or "change how to capture images and recapture images."

An example of the warning to be issued may read "An effect of parallax or a moving object is detected. Reduce the radius of rotation and recapture images."

As described above, in the fourth configuration, since whether or not a moving subject is present is judged immediately after the imaging is initiated, the user can recapture images.

As a result, since whether or not parallax affects the captured images is judged immediately after the imaging is initiated, the user can advantageously recapture images.

The fifth configuration will next be described.

[Fifth Configuration]

In the fifth configuration, an appropriate sweep angular speed (the speed at which the user swings the camera) is notified, and a warning is issued when the sweep angular speed is too fast. In this way, the user is prompted to recapture images.

As described above, the microprocessor 162 displays the output (sweep angular speed) from the attitude sensor (gyroscopic sensor) in the form of graph on the display device 18, such as the screen of an LCD, with the vertical axis representing the output and the horizontal axis representing time.

Since the highest sweep angular speed is determined when the horizontal angle of view, the number of horizontal pixels, and the shutter speed are set, the graph is displayed as shown in FIG. 4, in which the appropriate range RNG ranges from 60% of the highest sweep angular speed to 80% thereof.

A schematic procedure of the above operation is shown below.

[1] Press a start button in the operation unit 19 and rotate the camera. Then, release the start button.

[2] The sweep angular speed is displayed on the screen of the display device 18 as long as the start button is being pressed, as shown in FIG. 4.

[3] When the sweep angular speed is slower than the lower limit of the appropriate range RNG, no warning will be issued, whereas a warning sound will be produced when the sweep angular speed is faster, even instantaneously, than the upper limit of the appropriate range RNG.

As described above, in the fifth configuration, since the camera notifies an appropriate speed, there will be no inconvenience, for example: overlappings of areas is produced because the sweep angular speed is too fast, or only a narrow area is imaged because the sweep angular speed is too slow.

An example of computation of the sweep speed will be described with reference to FIGS. 22A to 22D.

<Computation of Sweep Speed>

A description will be made of a method for computing the sweep speed at which a blur-occurring angle, the number of blurred pixels, and other problems will not occur, provided that the exposure time, the number of pixels, the single-line readout time, the angle of view, the overlapping rate, the frame rate, and other parameters are determined.

The slowest one of the sweep speeds obtained from the following three equations is the highest angular speed under the determined conditions.

The tables shown in FIGS. 22A to 22D show calculated values of the number of blurred pixels, the frame rate, and other parameters, provided that the angle of view, the sweep speed, and a variety of other parameters are given.

The columns [1] to [6] show the results under different conditions.

A description will be made below under the condition [1] in FIGS. 22A to 22D by way of example.

The blur-occurring angle $ab2$, the number of blurred pixels $nb2$, and the frame rate f are determined by using the sweep speed $vp$, the angle of view $th$, the number of horizontal pixels H, and the overlapping rate k along with the computational equations shown at the right end of the tables in FIGS. 22A to 22D.

$$ab2 = vp \times (ts + n \times rs)1000$$

$$nb2 = vp \times (ts + n \times rs) \times H/th$$

$$f = 100/(100-k) \times H \times vp/n/th$$

The above equations are used to provide the sweep speed vp as follows:

$$vp = 1000 \times ab2/(ts + n \times rs) [\deg] \quad (1)$$

$$vp = nb2 \times th/H/(ts + n \times rs) [\deg/sec] \quad (2)$$

$$vp = (100-k)/100 \times n \times th \times f/H \quad (3)$$

The sweep speed is vp=68 [deg/sec], provided that the blur-occurring angle ab2 is 0.28 degrees, the exposure time is 1 [msec], the number of pixels along the shorter side n is 400 pixels, and the single-line readout time rs is 7.8 [μsec].

The sweep speed is vp=68 [deg/sec], provided that the number of blurred pixels nb2 is 19.9 pixels, the angle of view for the longer side th is 50 degrees, and the number of horizontal pixels H is 3560 pixels.

The sweep speed is vp=68 [deg/sec], provided that the overlapping rate k is 20% and the frame rate f is 15.13.

Therefore, when the parameters in the right hand of each of the equations (1), (2), and (3) described above are changed, the value of the sweep speed is constrained by the equations.

When the sweep operation is carried out at a speed higher than the value vp obtained from the equation (1), an optical hand-shaking correction device is operated beyond its limit.

When the sweep operation is carried out at a speed higher than the value vp obtained from the equation (2), the amount of blur exceeds a tolerance.

When the sweep operation is carried out at a speed higher than the value vp obtained from the equation (3), the amount of overlap decreases and even no overlap occurs in some cases, One or all of the first to fifth configurations having been described above in detail can be applied to the camera apparatus 10, or any appropriate combination of the first to fifth configurations can be employed.

The methods having been described above in detail can be configured in the form of program according to the above procedures and executed on a CPU or any other suitable computer.

Further, the programs described above can be configured to be stored in a semiconductor memory, a magnetic disk, an optical disk, a floppy disk (registered trademark), and any other suitable recording medium, accessed from a computer in which any of the above recording media is incorporated, and then executed.

The present application contains subject matter related to that disclosed in Japanese Priority Patent Application JP 2008-258114 filed in the Japan Patent Office on Oct. 3, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus for capturing multiple strip-shaped images to be combined to generate a panoramic image, comprising:
    an image sensor configured to capture the multiple strip-shaped images to be combined to generate the panoramic image while the imaging apparatus is being moved in a direction perpendicular to readout lines of the image sensor; and
    a system controller configured to detect any effect of parallax on the multiple strip-shaped images and issue a warning when any effect of parallax is detected to prompt image recapturing,
    wherein,
        each of the multiple strip-shaped images is a central portion that is clipped from an imaging range of the image sensor, and
        the multiple strip-shaped images are captured at an overlapping rate of 50% or higher so that any part of a subject appears in at least two temporally adjacent strip-shaped images.

2. The imaging apparatus according to claim 1, wherein the system controller comprises an image signal processor configured to combine the multiple strip-shaped images into a single image and detect any effect of parallax based on a similarity among motion vectors between adjacent strip-shaped images.

3. The imaging apparatus according to claim 2, wherein:
the image signal processor is further configured to carry out multiple motion detection operations in an area where two temporally adjacent strip-shaped images overlap with each other to determine multiple motion vectors, and
the system controller further comprises a control unit configured to issue the warning without distinguishing between an effect of parallax and a moving subject at a boundary between a moving object and a stationary subject.

4. A method for capturing multiple strip-shaped images to be combined to generate a panoramic image by an imaging apparatus, the method comprising the steps of:
capturing the multiple strip-shaped images be combined to generate the panoramic image while the imaging apparatus is being moved in a direction perpendicular to readout lines of the image sensor;
detecting any effect of parallax on the multiple strip-shaped images; and
issuing a warning when any effect of parallax is detected to prompt image recapturing,
wherein,
each of the multiple strip-shaped images is a central portion that is clipped from an imaging range of the image sensor, and
the multiple strip-shaped images are captured at an overlapping rate at 50% or higher so that any part of a subject appears in at least two temporally adjacent strip-shaped images.

5. The method according to claim 4, further comprising the steps of:
combining the multiple strip-shaped images into a single image; and
detecting any effect of parallax based on a similarity among motion vectors between adjacent strip-shaped images.

6. The method according to claim 5, wherein:
multiple motion detection operations are carried out in an area where two temporally adjacent strip-shaped images overlap with each other to determine multiple motion vectors, and
the warning is issued in response to an effect of parallax and a moving subject not distinguished from each other at a boundary between a moving object and a stationary object.

7. A non-transitory computer readable medium having stored thereon computer executable instructions for capturing multiple strip-shaped images that are subject to be combined to generate a panoramic image by an imaging apparatus, the instructions comprising:
capturing the multiple strip-shaped images that are subject to be combined to generate the panoramic image while the imaging apparatus is being moved in a direction perpendicular to readout lines of the image sensor;
detecting any effect of parallax on the multiple strip-shaped images; and
issuing a warning when any effect of parallax is detected to prompt image recapturing,
wherein,
each of the multiple strip-shaped images is a central portion that is clipped from an imaging range of the image sensor, and
the multiple strip-shaped images are captured at an overlapping rate at 50% or higher so that any part of a subject appears in at least two temporally adjacent strip-shaped images.

8. The imaging apparatus of claim 2, wherein the image signal processor is further configured to carry out multiple motion detection operations in an area where two temporally adjacent strip-shaped images overlap with each other to determine multiple motion vectors, and recognize that an effect of parallax is detected when motion vectors having different values are present.

9. The method of claim 5, wherein:
multiple motion detection operations are carried out in an area where two temporally adjacent strip-shaped images overlap with each other to determine multiple motion vectors, and
an effect of parallax is detected when motion vectors having different values are present.

10. The imaging apparatus of claim 1, wherein the panoramic image is a two-dimensional panoramic image.

11. The imaging apparatus of claim 1, wherein the multiple strip-shaped images are captured from a single point.

12. The imaging apparatus of claim 1, further comprising:
an attitude sensor configured to detect attitude of the imaging apparatus and supply the detected attitude to the system controller while the imaging apparatus is being moved.

* * * * *